US011952239B2

(12) United States Patent
Chiba et al.

(10) Patent No.: US 11,952,239 B2
(45) Date of Patent: Apr. 9, 2024

(54) SHEET FEEDING DEVICE AND IMAGE FORMING APPARATUS

(71) Applicant: CANON KABUSHIKI KAISHA, Tokyo (JP)

(72) Inventors: Yoshinao Chiba, Chiba (JP); Shingo Iwami, Tokyo (JP); Koji Suzuki, Chiba (JP); Yuma Inui, Ibaraki (JP); Yoshiya Numata, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 338 days.

(21) Appl. No.: 17/539,319

(22) Filed: Dec. 1, 2021

(65) Prior Publication Data

US 2022/0227596 A1 Jul. 21, 2022

(30) Foreign Application Priority Data

Jan. 18, 2021 (JP) ................................ 2021-005875

(51) Int. Cl.
*B65H 9/16* (2006.01)
*B65H 7/10* (2006.01)
*B65H 7/14* (2006.01)
*B65H 9/04* (2006.01)
*G03G 15/00* (2006.01)

(52) U.S. Cl.
CPC ............... *B65H 9/166* (2013.01); *B65H 7/10* (2013.01); *B65H 7/14* (2013.01); *B65H 9/04* (2013.01); *G03G 15/6529* (2013.01); *G03G 15/6564* (2013.01); *B65H 2301/361* (2013.01); *B65H 2404/1441* (2013.01); *B65H 2801/06* (2013.01)

(58) Field of Classification Search
CPC .... B65H 9/166; B65H 9/04; B65H 2301/361; B65H 2404/1441; B65H 2404/144; B65H 7/10; G03G 15/6529
USPC .......................................................... 271/251
See application file for complete search history.

(56) References Cited

U.S. PATENT DOCUMENTS

| | | | |
|---|---|---|---|
| 4,367,948 | A | 1/1983 | Suzuki |
| 4,482,243 | A | 11/1984 | Suzuki et al. |
| 5,350,166 | A | 9/1994 | Shimizu et al. |
| 5,625,444 | A | 4/1997 | Suzuki et al. |
| 5,729,816 | A | 3/1998 | Matsumoto et al. |
| 5,774,204 | A | 6/1998 | Suzuki et al. |
| 5,870,114 | A | 2/1999 | Numata et al. |
| 6,094,559 | A | 7/2000 | Otsuka et al. |

(Continued)

FOREIGN PATENT DOCUMENTS

| | | |
|---|---|---|
| JP | H11-189355 A | 7/1999 |

*Primary Examiner* — Jeremy R Severson
(74) *Attorney, Agent, or Firm* — Venable LLP

(57) ABSTRACT

A sheet feeding device includes a feeding roller pair, a detecting portion, a first changing portion, a second changing portion, and a controller for controlling the first changing portion and the second changing portion. The controller starts a first feeding operation for feeding a sheet toward the obliquely feeding roller pair in a nipping state of the feeding roller pair and then starts a second feeding operation for feeding the sheet for abutting a side end of the sheet against the reference member in the nipping state of the obliquely feeding roller pair. The controller changes, after the first feeding operation is started and before the second feeding operation is started, a start timing of the second feeding operation on the basis of a detection result of a position of the side end of the sheet detected by the detecting portion.

9 Claims, 20 Drawing Sheets

(56) References Cited

U.S. PATENT DOCUMENTS

| | | | | |
|---|---|---|---|---|
| 6,262,752 | B1 | 7/2001 | Suzuki et al. | |
| 6,273,418 | B1 | 8/2001 | Fujikura et al. | |
| 6,323,939 | B1 | 11/2001 | Suzuki | |
| 6,473,579 | B1 | 10/2002 | Suzuki et al. | |
| 6,595,515 | B2 | 7/2003 | Numata et al. | |
| 6,619,657 | B2 | 9/2003 | Horikoshi et al. | |
| 6,628,905 | B2 | 9/2003 | Hori et al. | |
| 6,764,236 | B2 | 7/2004 | Suzuki | |
| 8,651,477 | B2 | 2/2014 | Chiba | |
| 9,102,488 | B2 | 8/2015 | Chiba et al. | |
| 9,227,806 | B2 | 1/2016 | Chiba | |
| 9,254,973 | B2 | 2/2016 | Ishida et al. | |
| 9,327,926 | B2 | 5/2016 | Chiba | |
| 9,567,172 | B2 | 2/2017 | Chiba et al. | |
| 9,908,727 | B2 | 3/2018 | Iwami et al. | |
| 10,160,237 | B2 * | 12/2018 | Herrmann ................ | B65H 9/16 |
| 10,543,996 | B2 | 1/2020 | Chiba | |
| 10,589,948 | B2 | 3/2020 | Inui | |
| 10,723,575 | B2 | 7/2020 | Chiba et al. | |
| 10,807,818 | B2 | 10/2020 | Chiba | |
| 10,836,595 | B2 | 11/2020 | Chiba | |
| 11,180,331 | B2 | 11/2021 | Inui | |
| 2020/0207562 | A1 | 7/2020 | Chiba | |
| 2022/0009734 | A1 | 1/2022 | Numata | |

* cited by examiner

SHEET FEEDING DEVICE AND IMAGE FORMING APPARATUS

FIELD OF THE INVENTION AND RELATED ART

The present invention relates to a sheet feeding device for feeding a sheet and an image forming apparatus for forming an image on the sheet.

In the image forming apparatus, when the sheet fed causes inclination (oblique movement) or positional deviation with respect to a widthwise direction perpendicular to a sheet feeding direction, positional deviation of the image from the sheet occurs. For that reason, in the image forming apparatus, a sheet alignment device (oblique movement correction device) for correcting the oblique movement of the sheet is mounted. Japanese Laid-Open Patent Application Hei 11-189355 discloses the sheet alignment device of a type in which the oblique movement and the positional deviation of the sheet are corrected on the basis of a side end of the sheet during feeding (hereinafter, this type is referred to as a side registration type).

In the sheet alignment device of the side registration type, an abutment reference member for abutting a sheet side end and obliquely feeding rollers inclined obliquely with respect to the sheet feeding direction are used.

When the oblique movement correction is made, first, the sheet is fed toward the obliquely feeding rollers, a nip of the upstream feeding roller is released. Thereafter, the sheet is fed in the widthwise direction and the feeding direction by the obliquely feeding rollers, so that the sheet side end is abutted against the abutment reference member. Thereafter, the sheet is fed toward a downstream feeding roller along the abutment reference member while the obliquely feeding rollers slip with the sheet. By this, the sheet side end is subjected to the oblique movement correction so as to follow the abutment reference member.

However, in the above-described constitution, a feeding distance in which the obliquely feeding rollers slip with the sheet changes depending on a position of the sheet side end with respect to the sheet widthwise direction when the sheet is fed toward the obliquely feeding rollers by the upstream feeding roller.

That is, in the case where the sheet side end starts abutment against the reference member on an upstream side of the reference member with respect to the sheet feeding direction, the feeding distance in which the sheet side end is fed while abutting against the reference member becomes long. That is, the feeding distance in which the sheet is fed while being slipped between itself and the obliquely feeding rollers becomes long, and therefore, a lowering in sheet feeding speed becomes large. On the other hand, in the case where the sheet side end starts the abutment against the reference member on a downstream side of the reference member, the feeding distance in which the sheet side end is fed while abutting against the reference member becomes short. That is, the feeding distance in which the sheet is fed while being slipped between itself and the obliquely feeding rollers is short, and therefore, the lowering in sheet feeding speed is small.

As described above, a variation in feeding distance in which the sheet is fed by the obliquely feeding rollers while being slipped leads to a variation in feeding speed. With an increasing degree of the variation in feeding speed of the sheet, there is a need that a distance between a current sheet and a subsequent sheet is estimated as a large value, so that productivity of the sheet feeding device was not high.

SUMMARY OF THE INVENTION

A principal object of the present invention is to provide a sheet feeding device capable of improving productivity thereof by reducing a variation in sheet feeding speed.

According to an aspect of the present invention, there is provided a sheet feeding device comprising: a feeding roller pair for feeding a sheet in a sheet feeding direction; a reference member provided downstream of the feeding roller pair with respect to the sheet feeding direction and extending along the sheet feeding direction; an obliquely feeding roller pair provided downstream of the feeding roller pair with respect to the sheet feeding direction and configured to feed the sheet in the sheet feeding direction while abutting a side end of the sheet against the reference member with respect to a sheet widthwise direction perpendicular to the sheet feeding direction; detecting means provided upstream of the obliquely feeding roller pair and configured to detect a position of the side end of the sheet with respect to the sheet widthwise direction; first changing means configured to change a state of the feeding roller pair between a nipping state in which the sheet is nipped and fed and a non-nipping state in which nipping of the sheet is released; second changing means configured to change a state of the obliquely feeding roller pair between the nipping state and the non-nipping state; and a controller configured to control the first changing means and the second changing means, wherein the controller causes the feeding roller pair to be in the nipping state and to start a first feeding operation for feeding the sheet toward the obliquely feeding roller and then, the controller causes the obliquely feeding roller pair to be in the nipping state and to start a second feeding operation for feeding the sheet for abutting the side end against the reference member, wherein the controller changes, after the first feeding operation is started and before the second feeding operation is started, a start timing of the second feeding operation on the basis of a detection result of the position of the side end of the sheet detected by the detecting means.

Further features of the present invention will become apparent from the following description of exemplary embodiments with reference to the attached drawings.

DESCRIPTION OF THE EMBODIMENTS

Figure 1:
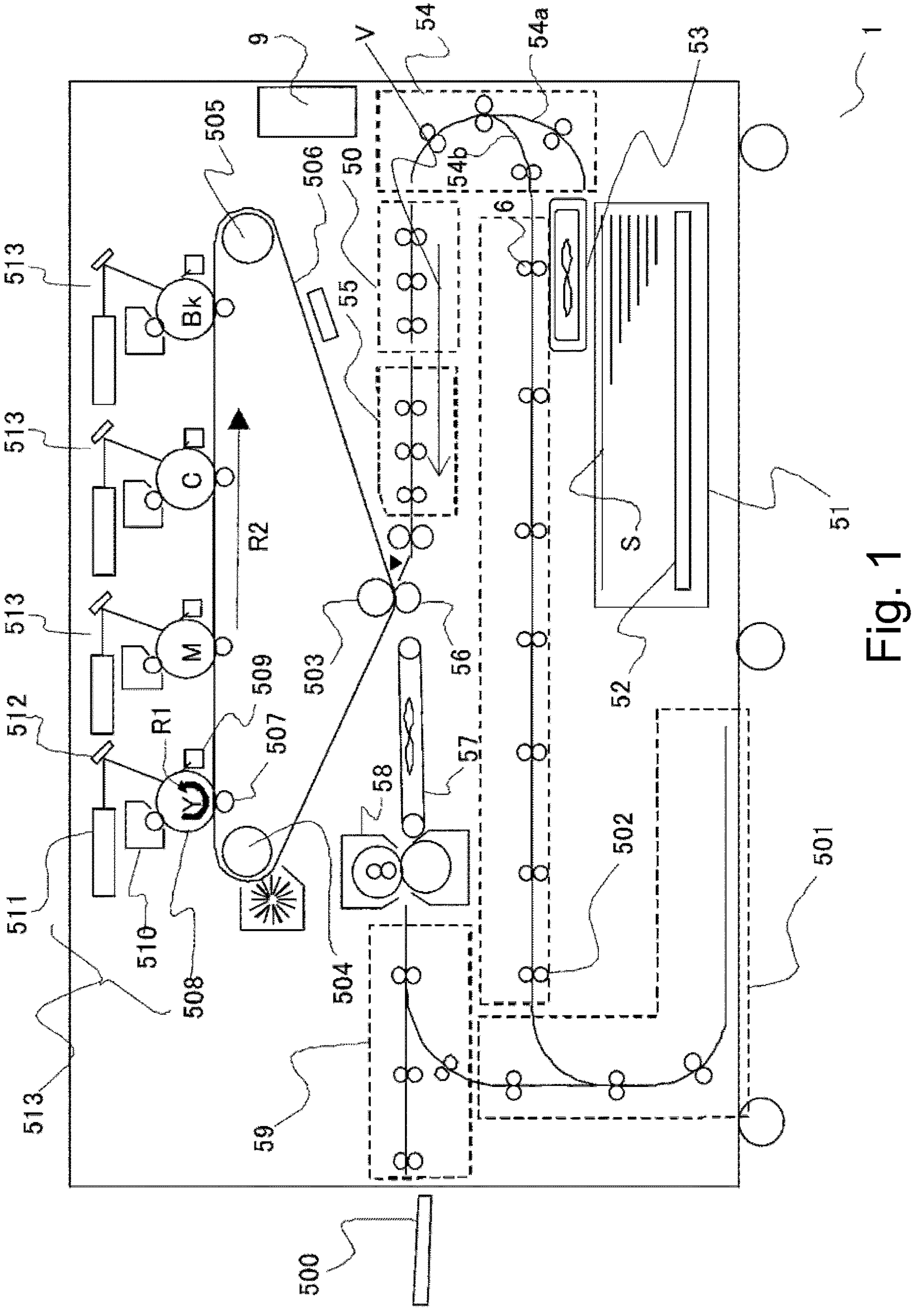
FIG. 1 is a schematic view of an image forming apparatus according to an embodiment of the present invention.

In the following, an exemplary embodiment of the present invention will be described while making reference to the drawings.

(Image Forming Apparatus)

First, a general structure of an image forming apparatus according to this embodiment will be described. The image forming apparatus may be a printer, a copying machine, a multi-function machine, or the like. As the image forming apparatus, a monochromatic image forming apparatus for forming a monochromatic image and a color image forming apparatus for forming a color image exist. The image forming apparatus of an electrophotographic type is classified depending on a transfer type into an intermediary transfer type in which an image is transferred from an image bearing member (electrophotographic photosensitive member) onto a sheet as a recording material via an intermediary transfer member and a direct transfer type in which the image is directly transferred onto the sheet without via the intermediary transfer member. Further, the color image forming apparatus employing the electrophotographic type is classified depending on a structural difference into a tandem type in which a plurality of image forming portions each for forming an image with toner are linearly arranged and a rotary type in which the plurality of image forming portions are circumferentially arranged.

In the following embodiments, an image forming apparatus 1 shown in FIG. 1 will be described. The image forming apparatus 1 is a color image forming apparatus of the intermediary transfer type and the tandem type in which image forming portions Y, M, C and Bk for forming toner images with toners of four colors are disposed along an intermediary transfer belt which is an intermediary transfer member 506. In the intermediary transfer type, different from the direct transfer type, there is no need to hold the sheet on a transfer drum or a transfer belt, and therefore, the intermediary transfer type is capable of meeting diverse recording materials such as super-thick paper an coated paper. Further, the intermediary transfer type and the tandem type are suitable for realizing high productivity from features such as parallel processing in the plurality of image forming portions and simultaneous transfer of the toner images for a full-color image.

By using FIG. 1, a schematic structure and an image forming operation of the image forming apparatus 1 will be described. Sheets S are accommodated in the form of being stacked on a lift-up device 52 of a sheet feeding device 51, and the sheet S is fed by being timed to image formation of an image forming portion 513, by a feeding unit 53 as a sheet feeding means. As the sheet S which is the recording material, it is possible to use various sheet materials different in size and material, including papers such as plain paper and thick paper, a plastic film, a cloth, a sheet material subjected to surface treatment, such as coated paper, a sheet material with a special shape, such as an envelope or index paper, and the like. A feeding unit 53 uses an air suction type in which the sheet S is separated by attracting an uppermost sheet S to a belt surface by a fan and then is fed by rotation of a belt. A sheet feeding means is not limited to thereto, and for example, a feeding roller rotatable in contact with the sheet S and a separation roller provided opposed to the feeding roller and for separating the sheet S by a frictional force may also be used in combination.

The sheet S fed by the feeding unit 53 passes through a feeding path 54*a* and a feeding portion 50 and is conveyed to an oblique movement correcting portion 55. The sheet S is subjected to oblique movement correction and timing correction in the oblique movement correcting portion 55, and thereafter, is sent to a secondary transfer portion by a registration roller pair 7. The secondary transfer portion is a nip formed by an inner secondary transfer roller 503 and an outer secondary transfer roller 56 which oppose each other via the intermediary transfer belt 506.

An image forming process performed in parallel to the above-described feeding process of the sheet S to the secondary transfer portion. The image forming portion 513 includes a photosensitive member 508, an exposure device 511, a developing device 510, a primary transfer device 507, a photosensitive member cleaner 509, and a charger. The photosensitive member (photosensitive drum) 508 formed in a cylindrical shape is rotated in an arrow R1 direction in the figure, and a surface of the photosensitive member 508 is electrically charged uniformly by the charger such as a charging roller or a corona charger. The exposure device 511 emits light on the basis of a signal of image information sent from an external device to the image forming apparatus 1, so that the surface of the photosensitive member 508 is exposed to the light via a diffraction device 512 or the like, and thus an electrostatic latent image corresponding to the image information is formed on the surface of the photosensitive member 508. The developing device 510 develops the electrostatic latent image with a developer containing toner, so that a toner image is formed as a visible image. Thereafter, the toner image on the photosensitive member 508 is transferred (primary-transferred) onto the intermediary transfer belt 506 by being supplied with a predetermined pressing force and a predetermined electrostatic load bias by the primary transfer device 507. Therefore, transfer residual toner remaining on the photosensitive member 508 is collected by a photosensitive member cleaner 509, and the surface of the sheet member 508 is in a state of being usable again in subsequent image formation. The image forming apparatus 1 of FIG. 1 includes four sets of image forming portions 513 each having the above-described constitution and for forming toner images of colors of yellow (Y), magenta (M), cyan (C) and black (Bk).

Next, the intermediary transfer belt 506 will be described. The intermediary transfer belt 506 is stretched by a driving roller 504, a tension roller 505, and the inner secondary transfer roller 503, and is fed and driven in an arrow R2 direction in the figure. Accordingly, image forming processes for the respective colors which are processed in parallel by the four image forming portions 513 are carried out at timings synchronized so that the color toner images primary-transferred onto the intermediary transfer belt 506 are superposed with each other. As a result, finally, a full-color toner image is formed on the intermediary transfer belt 506 and is fed to the secondary transfer portion. In the secondary transfer portion, a predetermined pressing force and a predetermined electrostatic load bias are applied to the sheet S, so that the full-color toner image is transferred (secondary-transferred) from the intermediary transfer belt 506 onto the sheet S. That is, the image is formed on the sheet S.

Thereafter, the sheet S is fed to a fixing device 58 by a pre-fixing feeding device 57. The fixing device 58 performs a fixing process by applying heat and pressure to the toner image on the sheet S by a heating mechanism such as a halogen lamp or an IH heating unit while nipping and feeding the sheet by opposing rollers or belts, or the like. The sheet S on which the fixed image is formed is subjected to route selection such that the sheet S is discharged as it is onto a discharge tray 500 by a branch feeding device 59 or is fed to a double-side feeding device 501 in the case where double-side image formation is required. The sheet S fed to the double-side feeding device 501 after the image is formed on a first surface is delivered to the feeding portion 50 via a double-side feeding portion 502 and a feeding passage 54*b* in a state in which the sheet S is reversed by switch-back feeding. Then, by an operation similar to the operation for the first surface, the image is formed on a second surface, and thereafter, the sheet is discharged onto the discharge tray 500.

Incidentally, in this embodiment, the image forming apparatus of the intermediary transfer type and the tandem type was described as an example, but technology described in the following is also applicable to those of the direct transfer type and the like. Further, the present invention is not limited to the image forming apparatus of the electrophotographic type, and for example, the following technology may also be applied to an image forming apparatus including, as an image forming means, an image forming unit of an ink jet type or an offset printing mechanism.

(Sheet Alignment Device)

The image forming apparatus 1 of this embodiment includes, as the sheet feeding device on a side upstream of the secondary transfer portion with respect to the sheet feeding direction, a sheet alignment device including an oblique movement correcting portion 55 for correcting a positional deviation and inclination (oblique movement) of the sheet during feeding is provided. This sheet alignment device is of a correction type (side registration type) for correcting the positional deviation of the sheet on the basis of a side end of the sheet during the feeding. Incidentally, the sheet alignment device of the side registration type is not limited to a sheet alignment device disposed immediately in front of the transfer portion in the image forming apparatus, but may also be disposed in the double-side feeding portion 502 for correcting, for example, a positional deviation and inclination of the sheet in a feeding process in double-side printing. Further, the sheet alignment device may also be disposed in a sheet treatment device in which the sheet on which the image is formed by the image forming apparatus 1 is received and is subjected to treatment (processing) such as bookbinding treatment or cutting treatment.

Figure 2:
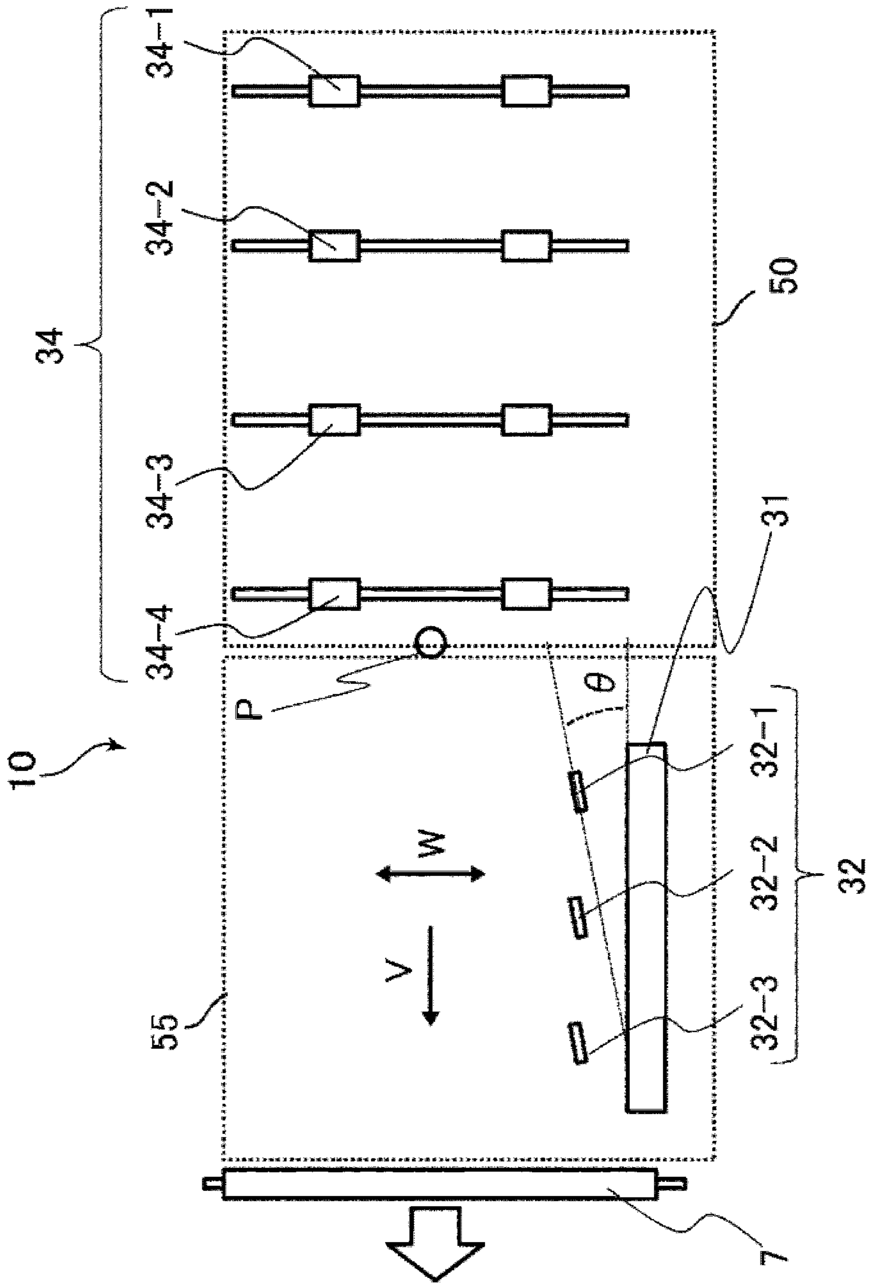
FIG. 2 is a schematic view of a sheet feeding device of a side registration type.

FIG. 2 is a schematic view sharing a sheet alignment device 10 as viewed from an upper side of FIG. 1 with respect to a direction (up-down direction of FIG. 1) perpendicular to a sheet feeding direction V and a sheet widthwise direction W. In the following, the sheet feeding direction V refers to a direction (leftward direction in FIG. 1, sub-scan direction during the image formation) in which the sheet S is fed from the feeding portion 50 toward the oblique movement correcting portion 55. The sheet widthwise direction W refers to a direction (rotational axis direction of a feeding roller pair 34-1 or the like described below, main-scan direction during the image formation) perpendicular to the sheet feeding direction V.

As shown in FIG. 2, the sheet alignment device 10 includes the feeding portion 50, the oblique movement correcting portion 55, and a registration roller pair 7. The feeding portion 50 includes a feeding roller group consisting of a plurality of feeding roller pairs 34-1, 34-2, 34-3 and 34-4. Each of the feeding roller pairs 34-1, 34-2, 34-3 and 34-4 includes a driving roller rotationally driven by a feeding roller driving motor M1 (FIG. 8) provided as a driving source and a follower roller driven by the driving roller. Each of the driving roller and the follower roller is rotated about a rotation shaft extending in the sheet widthwise direction W. Accordingly, each of the feeding roller pairs 34-1, 34-2, 34-3 and 34-4 feeds the sheet S in the sheet feeding direction V while nipping the sheet S in a nip between the driving roller and the follower roller.

Further, at least a part (preferably all) of the feeding roller group 34 is changeable in state between a state (nipping state) in which the sheet S is nipped in the nip at a predetermined pressure and a state (non-nipping state, released state) in which the nipping of the sheet S is released. That is, one roller shaft of the driving roller and the follower roller is movably supported so as to approach or away from the other roller shaft. The roller shaft is moved by the driving force of a feeding roller mounting/dismounting motor M4 (FIG. 8) provided correspondingly to each of the feeding roller pairs 34-1 to 34-4, so that a nipping state in which the driving roller and the follower roller are press-contacted to each other and a non-nipping state in which the driving roller and the follower roller are spaced from each other are switched.

In the neighborhood of the most downstream feeding roller pair 34-4 (in the neighborhood of a downstream side in the constitution of FIG. 2) with respect to the sheet feeding direction and at a central position of the feeding roller pair 34-4 with respect to the sheet widthwise direction W, a pre-registration sensor P is provided. The central position of the feeding roller pair 34-4 with respect to the sheet widthwise direction W refers to a central portion between opposite end portion positions of the nip with respect to the sheet widthwise direction W. The pre-registration sensor P is an optical sensor (reaction photoelectric sensor) including a light emitting portion and a light receiving portion, and detects passing of the sheet S by emitting light from the light emitting portion toward a space in which the sheet S passes and then by detecting reflected light from the sheet S by the light receiving portion when the sheet S passes through the space. In other words, a controller 100 (FIG. 8) as a control means of the image forming apparatus 1 is capable of detecting a passing timing of the sheet S at a detecting position of the pre-registration sensor P on the basis of a signal outputted from the light receiving portion of the pre-registration sensor P.

On a side downstream of the feeding portion 50 and the pre-registration sensor P with respect to the sheet feeding direction V, the oblique movement correcting portion 55 is provided. The oblique movement correcting portion 55 includes an abutment reference plate 31 and an obliquely feeding roller group consisting of a plurality of obliquely feeding roller pairs 32-1, 32-2 and 32-3. The abutment reference plate 31 is provided on one end side of the oblique movement correcting portion 55 with respect to the sheet widthwise direction W and includes an abutment surface (reference surface) extending in the sheet feeding direction V. The abutment reference plate 31 functions as a reference member for correcting positional deviation and inclination of the sheet S by abutting one side end of the sheet S with respect to the sheet widthwise direction W thereagainst.

Each of the obliquely feeding roller pairs 32-1, 32-2 and 32-3 includes the driving roller rotationally driven by an obliquely feeding roller driving motor M2 (FIG. 8) provided as a driving source and includes the follower roller rotated by the driving roller. At least one of the driving roller and the follower roller (in general, the driving roller) is constituted as the obliquely feeding roller extending in a direction inclined with respect to the sheet widthwise direction W as viewed from above and rotating about a rotational axis. The inclination direction is a direction in which the obliquely feeding roller extends toward a downstream of the sheet feeding direction V as the obliquely feeding roller is close to the abutment reference plate 31 with respect to the sheet widthwise direction W. Accordingly, each of the obliquely feeding roller pairs 32-1, 32-2 and 32-3 nips the sheet S in the nip between the driving roller and the follower roller and feeds (obliquely feeds) the sheet S in the direction inclined with respect to the sheet feeding direction V so that the sheet S approaches the abutment reference plate 32 with respect to the sheet widthwise direction W toward the downstream of the sheet feeding direction V. A direction (movement direction of a peripheral surface of the obliquely feeding roller in the nip) of a feeding force imparted to the sheet S by the obliquely feeding roller group 32 is inclined at a predetermined angle θ with respect to the sheet feeding direction V.

The sheet S is shifted toward the abutment reference plate 31 by the obliquely feeding roller group 32 and is fed along the abutment reference plate 31 in the sheet feeding direction V while the side end of the sheet S is abutted against the reference surface of the abutment reference plate 31. By this, the side end of the sheet S follows the reference surface of the abutment reference plate 31, so that not only the inclination of the sheet S is corrected, but also a side end position of the sheet S with respect to the sheet widthwise direction W is aligned with a position of the reference surface of the abutment reference plate 31.

At least a part (preferably all) of the obliquely feeding roller group 32 is capable of being changed in state between a state (nipping state) in which the sheet S is nipped in the nip at a predetermined pressing force and a state (non-nipping state, released state) in which nipping of the sheet S is released. That is, a roller shaft of one of the driving roller and the follower roller is supported movably toward and away from a roller shaft of the other roller. The roller shaft is moved by a driving force of an obliquely feeding roller mounting/dismounting motor M4 (FIG. 8) provided corresponding to each of the obliquely feeding roller pairs 32-1, 32-2 and 32-3, so that the nipping state in which the driving roller and the follower roller are press-contacted to each other and the non-nipping state in which the driving roller and the follower roller are spaced from each other are switched.

On a side further downstream of the oblique movement correcting portion 55 with respect to the sheet feeding direction V, a registration roller pair 7 for feeding the sheet S after the oblique movement correction is provided. The registration roller pair 7 is rotated about a rotational axis thereof extending in the sheet widthwise direction W and feeds the sheet S in the sheet feeding direction V.

Incidentally, in this embodiment, description will be made on the assumption that the feeding roller group 34 is constituted by the four feeding roller pairs 34-1, 34-2, 34-3 and 34-4 and that the obliquely feeding roller group 32 is constituted by the three obliquely feeding roller pair 32-1, 32-2 and 32-3, but the number of the rollers is changeable. The feeding portion 50 includes at least one feeding roller pair, and the oblique movement correcting portion 55 includes at least one obliquely feeding roller pair. Further, at least one of the feeding roller pair and the obliquely feeding roller pair is constituted so as to be changeable in state between the nipping state and the non-nipping state as desired in embodiments described later. Incidentally, when a contact pressure of the driving roller and the follower roller with the sheet S is sufficiently small (when the sheet S is capable of being easily slipped) in the non-nipping state, the driving roller and the follower roller may also be in contact with each other in the non-nipping state.

(Feeding Delay in Side Registration Type)

Here, a feeding delay which can occur in the sheet alignment device of the side registration type will be described. As described above, in the oblique movement correcting portion 55, the sheet S is fed while being abutted at a side end thereof against the abutment reference plate 31 by the obliquely feeding roller group 32. In the following, an operation in which the sheet S is fed while the side end of the sheet S is abutted against the abutment reference plate 31 is referred to as abutment feeding. An actual feeding speed of the sheet S in an abutment feeding state is large in variation, so that there is a possibility that a timing when a leading end of the sheet S reaches the registration roller pair 7 is delayed.

In the case where productivity of the image forming apparatus 1 is determined, the image formed by the image forming portion 513 and the sheet S fed one by one from the sheet feeding device 51 are caused to be capable of reaching the secondary transfer portion at synchronized timings. For that reason, in the case where there is a possibility that the feeding delay occurs in the sheet alignment device 10 as described above, an image forming interval (sheet interval) capable of being achieved is set in view of a degree of a possible feeding delay. Accordingly, in order to realize high productivity, a section (abutment feeding section) in which the abutment feeding is carried out in the oblique movement correcting portion 55 may desirably be shortened to the extent possible.

Figure 3A:
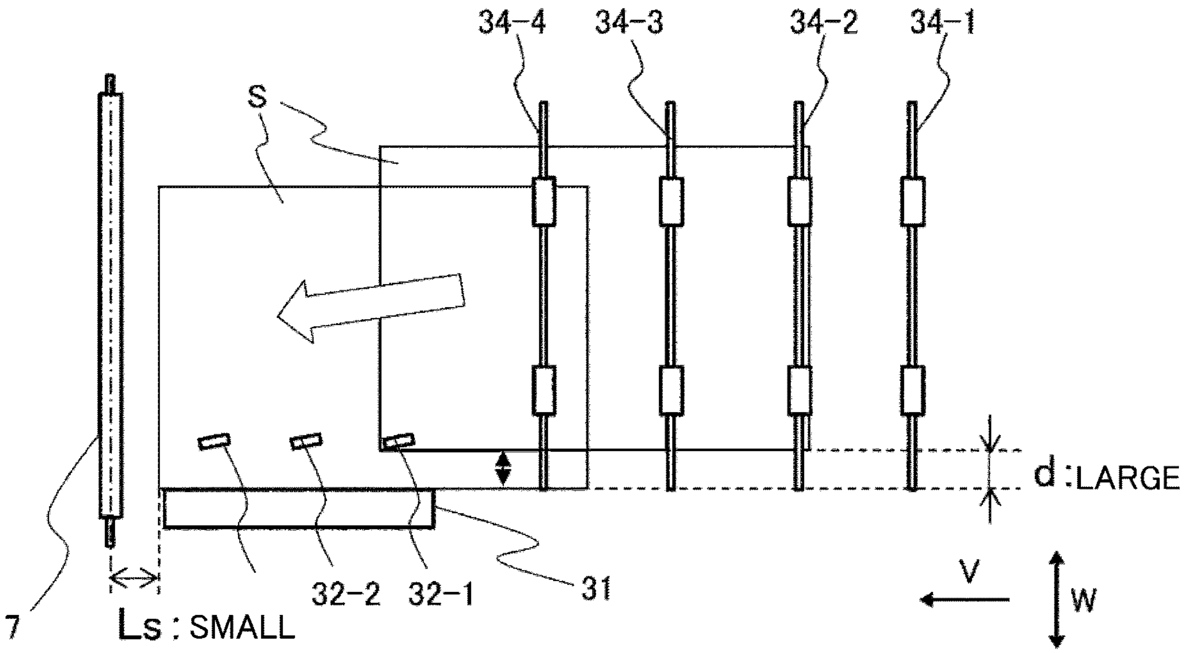
FIG. 3A is a schematic view for illustrating a sheet correcting operation by the side registration type in the case where a sheet side end is fed to a position away from a reference member.
Figure 3B:
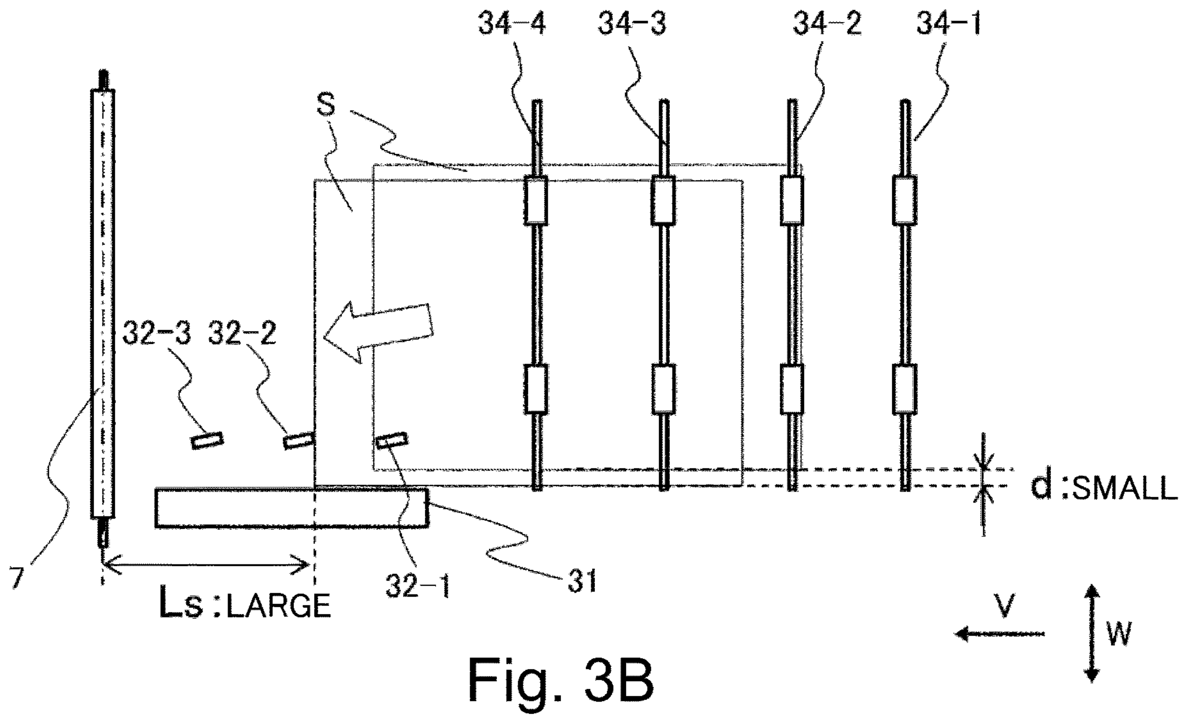
FIG. 3B is a schematic view for illustrating the sheet correcting operation by the side registration type in the case where the sheet side end is fed to a position close to the reference member.

However, in actuality, there is a variation in sheet position before alignment, and therefore, the abutment feeding is excessively carried out by exceeding a movement distance necessary to abut the sheet S against the abutment reference plate 31 in some cases. Parts (a) and (b) of FIG. 3 are schematic views each showing a state of the sheet feeding by the sheet alignment device, as viewed from above. In the figures, d represents a relative distance (distance with respect to the sheet widthwise direction W) between a side end position of the sheet S and the abutment reference plate 31 before the alignment. In the figures, Ls represents a feeding distance in an abutment state, i.e., a movement distance of the sheet S from the contact of the side end of the sheet S with the abutment reference plate 31 until the leading end (a downstream end with respect to the sheet feeding direction V) of the sheet S reaches the registration roller pair 7. Incidentally, in parts (a) and (b) of FIG. 3, at a point of time when the leading end of the sheet S reaches a predetermined position, obliquely feeding of the sheet S by the obliquely feeding roller group 32 is started.

As shown in part (a) of FIG. 3, in the case where a sheet side end before the alignment is away from the abutment reference plate 31 (in the case where d is large), even when the oblique feeding is started, it takes a relatively long time until the sheet side end contacts the abutment reference plate 31. As a result, the feeding distance Ls in the abutment state becomes relatively short, so that an occurring feeding delay becomes small.

On the other hand, as shown in part (b) of FIG. 3, in the case where the sheet side end before the alignment is close to the abutment reference plate 31 (in the case where d is small), after the start of the oblique feeding, the sheet side end contacts the abutment reference plate 31 early. As a result, the feeding distance Ls in the abutment state becomes long, so that the occurring feeding delay becomes large.

On a premise that the sheet feeding is start at the same timing, in either state of parts (a) and (b) of FIG. 3, in order to correct the inclination of the sheet with reliability, an oblique feeding start timing is set on the assumption of the state of part (a) of FIG. 3. Then, the feeding distance Ls in the abutment state in the case as shown in part (b) of FIG. 3 becomes excessively long, so that a large feeding delay constituting an obstruction to realization of high productivity can occur.

Figure 4:
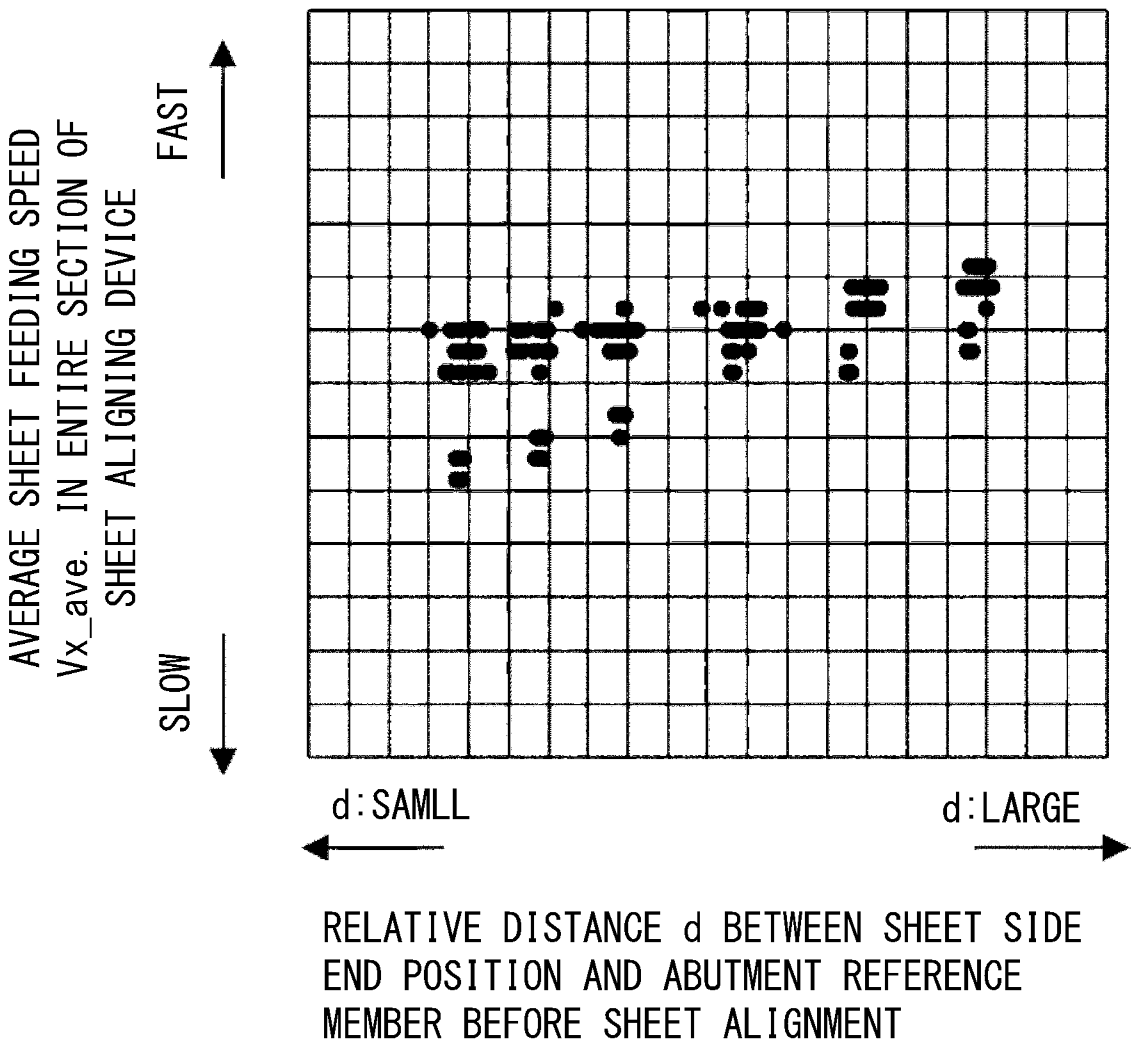
FIG. 4 is a graph showing a tendency of a feeding delay caused in the side registration type.

As shown in FIG. 4, an average sheet feeding speed Vx_ave. in entire sections of the sheet alignment device 10 tends to become slower with a smaller d and also tends to become larger in variation with the smaller d.

Figure 5:
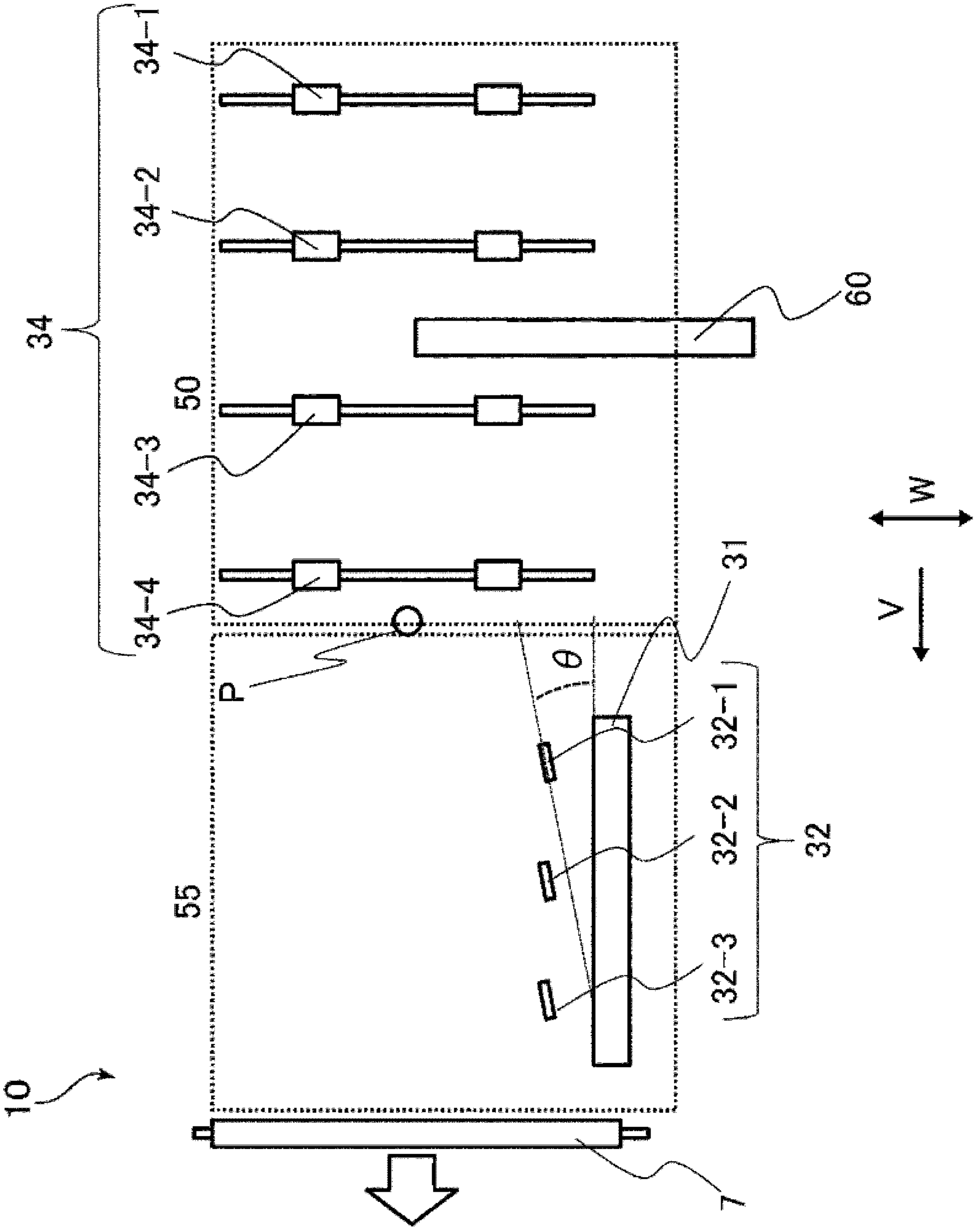
FIG. 5 is a schematic view of a sheet feeding device according to the embodiment.

Therefore, in this embodiment, as a detecting means for detecting the side end position of the sheet S before the alignment, a side end detecting portion 60 is provided in the sheet alignment device 10 as shown in FIG. 5. The controller 100 (FIG. 8) of the image forming apparatus 1 carries out control of a change in oblique feeding start timing by the obliquely feeding roller group 32 on the basis of a detection result of the side end position of the sheet S by the side end detecting portion 60 as illustrated in the following embodiments 1 to 4. By this, a reduction of a degree of the feeding delay is realized by suppressing excessive elongation of the feeding distance Ls in the abutment state.

In the sheet alignment device 10 in the present invention, "straight feeding" refers to an operation in which at least one of the feeding roller group 34 is in the nipping state and in which the sheet S is nipped and fed by the feeding roller pair in the nipping state (this operation is a first feeding operation in this embodiment). Further, "oblique feeding" refers to an operation in which at least one of the obliquely feeding roller group 32 is in the nipping state and in which the sheet S is nipped and fed by the obliquely feeding roller pair in the nipping state so that the side end of the sheet S abuts against the abutment reference plate 31 (this operation is a second operation in this embodiment). Whether or not the obliquely feeding roller group 32 is put in the nipping state during the straight feeding and whether or not the feeding roller group 34 is put in the nipping state during the oblique feeding are capable of being changed as illustrated in the following embodiments. An "oblique feeding start timing" is a timing when the feeding roller pair in the nipping state is changed in state to the non-nipping state or is a timing when the obliquely feeding roller pair in the non-nipping state is changed in state to the nipping state.

Embodiment 1

Figure 6:
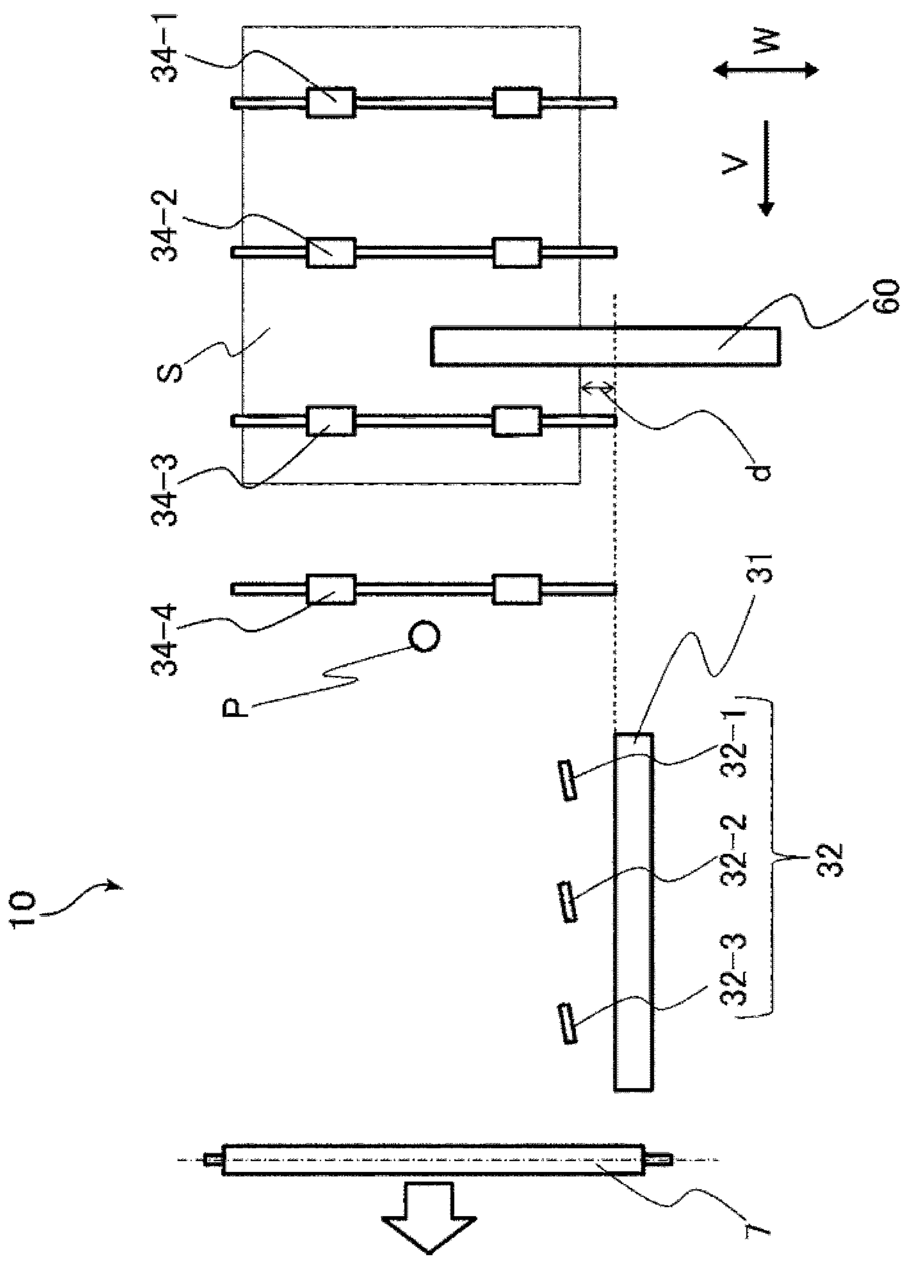
FIG. 6 is a schematic view showing a state when a detecting portion detects a side end position of a sheet in an embodiment 1.
Figure 7:
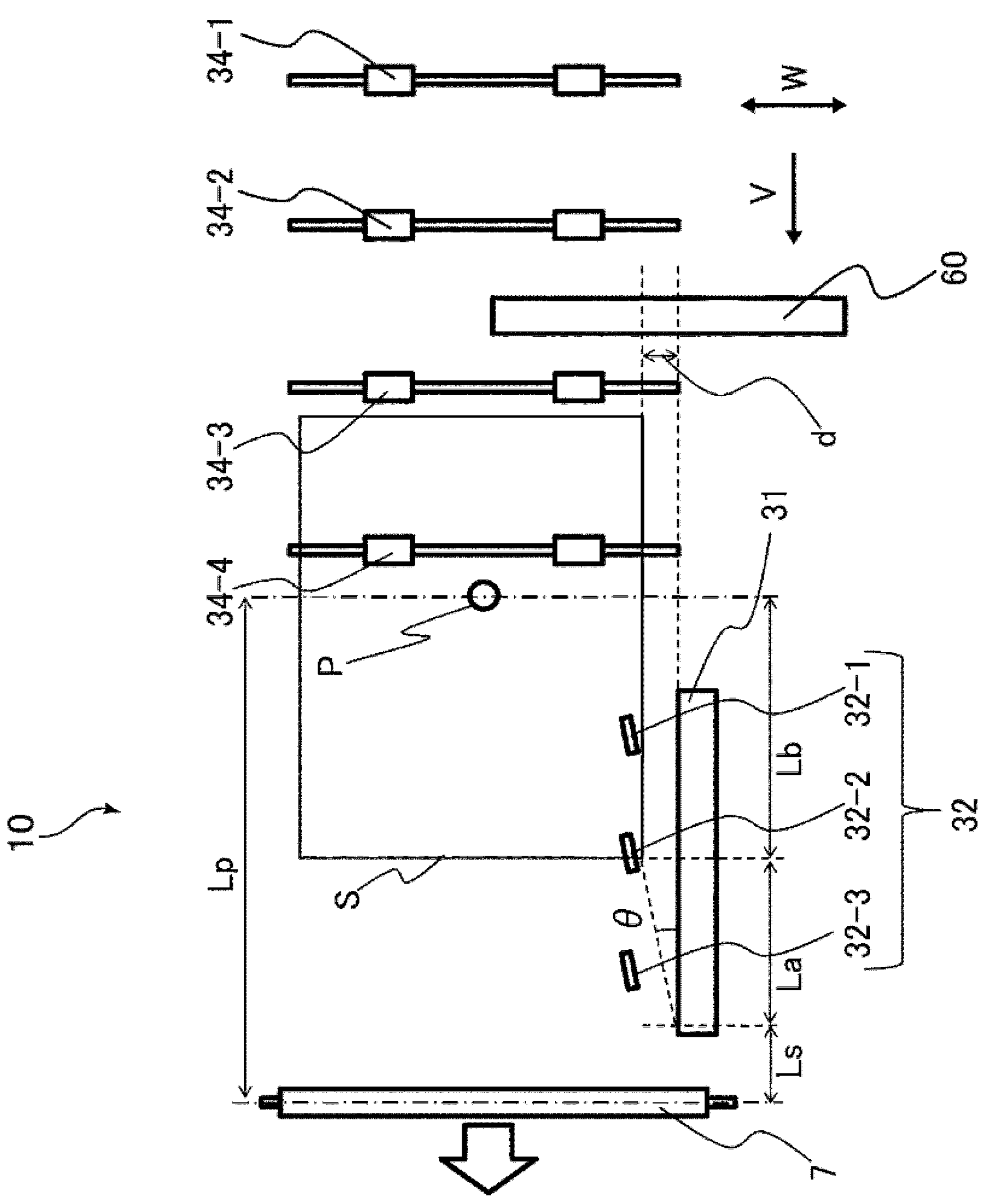
FIG. 7 is a schematic view showing a state when oblique movement of the sheet is started in the embodiment 1.

An embodiment 1 will be described using FIGS. 6 to 9. FIG. 6 shows the sheet alignment device 10 when the side end detecting portion 60 detects the position of a side end S1 of the sheet S during feeding, and FIG. 7 shows the sheet alignment device 10 when oblique feeding of the sheet S is started.

As the side end detecting portion 60 in this embodiment, a CIS (Contact Image Sensor) is employed. That is, the side end detecting portion 60 includes a light receiving element provided on a substrate with respect to the sheet widthwise direction W, an equal-magnification lens interposed between the light receiving element and the sheet S, and an irradiating portion (for example, an LED and a light guiding bar extending in the sheet widthwise direction W) for irradiating the sheet with light. However, a constitution (for example, an image reading unit of a CCD type or a plurality of reflection photoelectric sensors arranged in the sheet widthwise direction W) other than the CIS can also be used as the side end detecting portion 60.

Figure 8:
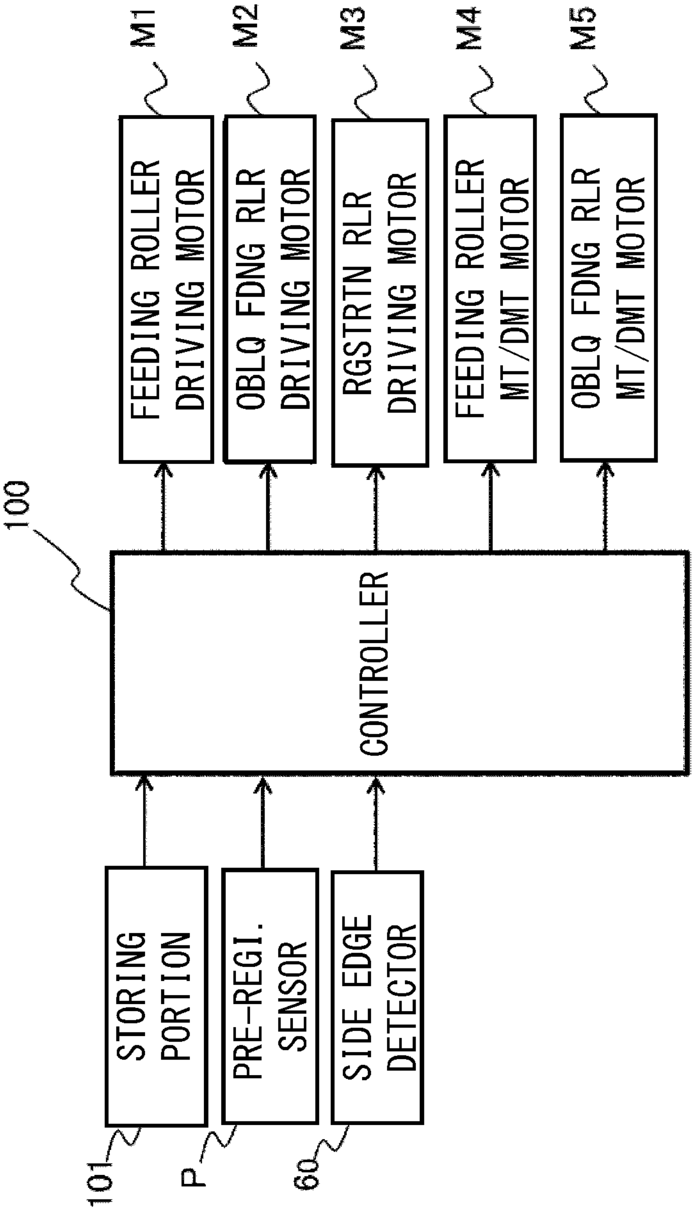
FIG. 8 is a block diagram showing a constitution of a sheet feeding device according to the embodiment 1.

FIG. 8 is a block diagram showing a system constitution on the image forming apparatus relating to control of the sheet alignment device 10 according to this embodiment. To an input side of the controller 100, a storing portion 101, the pre-registration sensor P, and the side end detecting portion 60 are connected. To an output side of the controller 100, the feeding roller driving motor M1, the obliquely feeding roller driving motor M2, a registration roller driving motor M3, the feeding roller mounting/dismounting motor M4, and the obliquely feeding roller mounting/dismounting motor M5 are connected. In this embodiment, the feeding roller driving motor M1 and the feeding roller mounting/dismounting motor M4 are provided corresponding to each of the feeding roller pairs of the feeding roller group 34, and the obliquely feeding roller driving motor M2 and the obliquely feeding roller mounting/dismounting motor M5 are provided correspondingly to each of the obliquely feeding roller pairs of the obliquely feeding roller group 32. The feeding roller mounting/dismounting motor M4 and the obliquely feeding roller mounting/dismounting motor M5 function as changing means for changing the states of the feeding roller group 34 and the obliquely feeding roller group 32, respectively, between the nipping state and the non-nipping state. Further, the feeding roller mounting/dismounting motor M4 is an example of a first changing portion, and the obliquely feeding roller mounting/dismounting motor M5 is an example of a second changing portion.

The controller 100 provides a drive instruction to each of the motors and controls drive states of the feeding roller group 34, the obliquely feeding roller group 32, and the registration roller pair 7, so that the controller 100 changes the states of the feeding roller group 34 and the obliquely feeding roller group 32 between the nipping state and the non-nipping state. The controller 100 includes at least one processor and controls the operation of the sheet alignment device 10 as described later in a flowchart.

Incidentally, in this embodiment, a feeding speed (peripheral speed of the driving roller) of each of the feeding roller group 34, the obliquely feeding roller group 32, and the registration roller pair 7 is set so that a component with respect to the sheet feeding direction V is the same value (Vx). Specifically, the feeding speed of each of the feeding roller group 34 and the registration roller pair 7 is set so that the peripheral speed of the driving roller is Vx. On the other hand, the obliquely feeding roller group 32 for imparting, to the sheet, a feeding force in a direction in which the obliquely feeding roller group 32 is inclined at an angle θ with respect to the sheet feeding direction V is controlled so that a peripheral speed of the obliquely feeding roller is Vx/cos θ.

Figure 9:
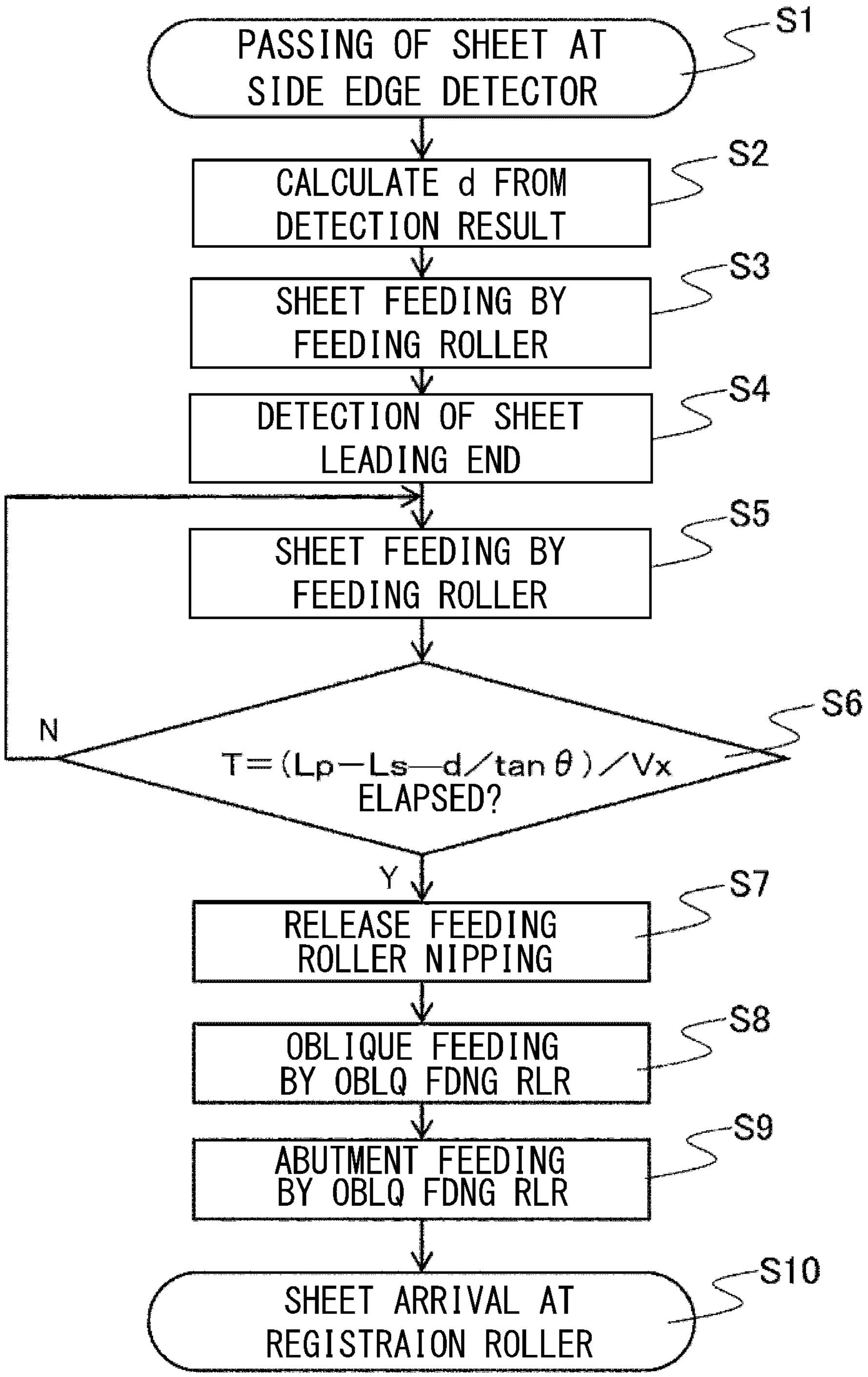
FIG. 9 is a flowchart showing feeding control of the sheet feeding device according to the embodiment 1.

FIG. 9 is a flowchart showing a control method in this embodiment. This flowchart shows processing contents relating to a sheet feeding operation from after the sheet S passes through the detecting position of the side end detecting portion 60 until the sheet S is delivered to the registration roller pair 7. Respective steps of the flowchart are performed by the controller 100 by reading and carrying out a program stored in the storing portion 101.

When the sheet S passes through the side end detecting portion 60 (S1), on the basis of a detection result of the side end detecting portion 60, a distance d from a side end S1 of the sheet S to the abutment reference plate 31 with respect to the sheet widthwise direction W is detected (S2). That is, the controller 100 detects the side end S1 of the sheet S from a line image read by the side end detecting portion 60, and calculates the distance d from an actual side end S1 to the abutment reference plate 31 on the basis of the position of the side end S1 in the image. A value of the detected distance d is stored in the storing portion 101.

Thereafter, the straight feeding of the sheet S by the feeding roller group 34 is continued (S3). When a leading end of the sheet S reaches the detecting position of the pre-registration sensor P, the sheet S is detected by the pre-registration sensor P (S4). Even after the leading end of the sheet S passes through the pre-registration sensor P, the straight feeding of the sheet S by the feeding roller group 34 is continued (S5).

After the leading end of the sheet S passes through the pre-registration sensor P, at a timing when a predetermined time T has elapsed, the nipping of the feeding roller group 34 is released (S6, S7). This feeding roller nipping release timing (predetermined time T) will be described later.

Here, in this embodiment, the state of the obliquely feeding roller group 32 is set at the nipping state before a start of the oblique feeding of the sheet S (during the straight feeding), and in the case where the oblique feeding is started, the feeding roller group 34 is put in the nipping state while the obliquely feeding roller group 32 is kept in the nipping state. That is, in a straight feeding section before the start of the oblique feeding, both the feeding roller group 34 and the obliquely feeding roller group are in the nipping state. In this section, the obliquely feeding roller group 32 slips on the sheet S and the sheet S is moved in the sheet feeding direction V in accordance with rotation of the feeding roller group 34, and therefore, the distance from the side end S1 of the sheet S to the abutment reference plate 31 is substantially constant. Incidentally, in order to stably slip the obliquely feeding roller pair, a constitution in which a force (nipping force) with which the obliquely feeding roller pair nips the sheet S in the nipping state is weaker than a force (nipping force) with which the feeding roller pair nips the sheet S in the nipping state can be employed.

When the nipping of the feeding roller group 34 is released at a timing when the above-described predetermined time T has elapsed, the sheet S released from the feeding roller group 34 is nipped by the obliquely feeding roller group 32 and is obliquely moved with respect to the sheet feeding direction V, so that the sheet S starts to approach the abutment reference plate 31 (S8). Then, when the side end S1 of the sheet S abuts against the abutment reference plate 31, while the obliquely feeding roller group 32 slips again on the sheet S, an abutment feeding state in which the sheet S is fed in the sheet feeding direction V along the abutment reference plate 31 is formed (S9). The sheet S of which position and inclination are corrected by the abutment feeding is thereafter delivered to the registration roller pair 8 (S10).

(Deriving Method of Oblique Feeding Start Timing)

Here, a deriving method of the predetermined time T for determining a timing when the oblique feeding of the b S is sheet S is started in this embodiment, i.e., a timing when the nipping of the feeding roller group 34 is released and the feeding of the sheet S is changed from the straight feeding to the oblique feeding will be specifically described.

In FIG. 7, a distance from the detecting position of the pre-registration sensor P to the registration roller pair 7 with respect to the sheet feeding direction V is referred to as Lp. A feeding distance of the sheet S with respect to the sheet feeding direction V in a section (straight feeding section) from passing of the leading end of the sheet S through the detecting position of the pre-registration sensor P until the oblique feeding is started is referred to as Lb. A feeding distance of the sheet S with respect to the sheet feeding direction V in a section (oblique feeding section) from a start of the oblique feeding of the sheet S until the side end S1 of the sheet 1 abuts against the abutment reference plate 31 is referred to as La. A feeding distance of the sheet S with respect to the sheet feeding direction V in a section (abutment feeding section) from the abutment of the side end S1 of the sheet S against the abutment reference plate 31 until the leading end of the sheet S reaches the registration roller pair 7 is referred to as Ls.

In this embodiment, the oblique feeding timing is set so that the feeding distance Ls in the abutment feeding section in FIG. 7 comes close to a necessary minimum value. That is, a value of the predetermined time T is calculated depending on a side end position before alignment detected by the side end detecting portion 60, so that even when the distance d from the side end S1 of the sheet S before the alignment to the abutment reference plate 31 varies, the feeding distance Ls in the abutment feeding section is made a substantially constant value.

Specifically, T is represented by the following formula (1).

$$T=Lb/Vx \quad (1)$$

Vx: Feeding direction speed (fixed value)

Lb: Feeding distance in straight feeding section

The above-described Lb is represented by the following formula (2).

$$Lb=Lp-La-Ls \quad (2)$$

Lp: Feeding distance (fixed value) from detecting position of pre-registration sensor P to registration roller pair 7

Ls: Feeding distance in oblique feeding section

The above-described La is represented by the following formula (3).

$$La=d/\tan\theta \quad (3)$$

d: Distance from side end of sheet before alignment to abutment reference plate 31 with respect to sheet widthwise direction W θ: Inclination angle of obliquely feeding roller (fixed value)

From the above-described formulas (1), (2) and (3), T is represented by the following formula (4).

$$T=(Lp-Ls-d/\tan\theta)/Vx \quad (4)$$

From the formula (4), T can be represented by a function with d as a variable. Accordingly, on the basis of a value of d detected by using the side end detecting portion 60 in S2 of FIG. 9, the controller 100 is capable of unambiguously acquiring a value of the predetermined toner T. Then, at a timing based on the acquired value of the predetermined time T, the nipping state of the feeding roller group 34 is released and the oblique feeding of the sheet S is started, whereby a distance in which an actual sheet S is abutted and fed can be made near to a target abutment feeding distance Ls. Incidentally, the above-described calculation of T is carried out by the controller 100 by using respective numerical values stored in the storing portion 101.

Figure 10:
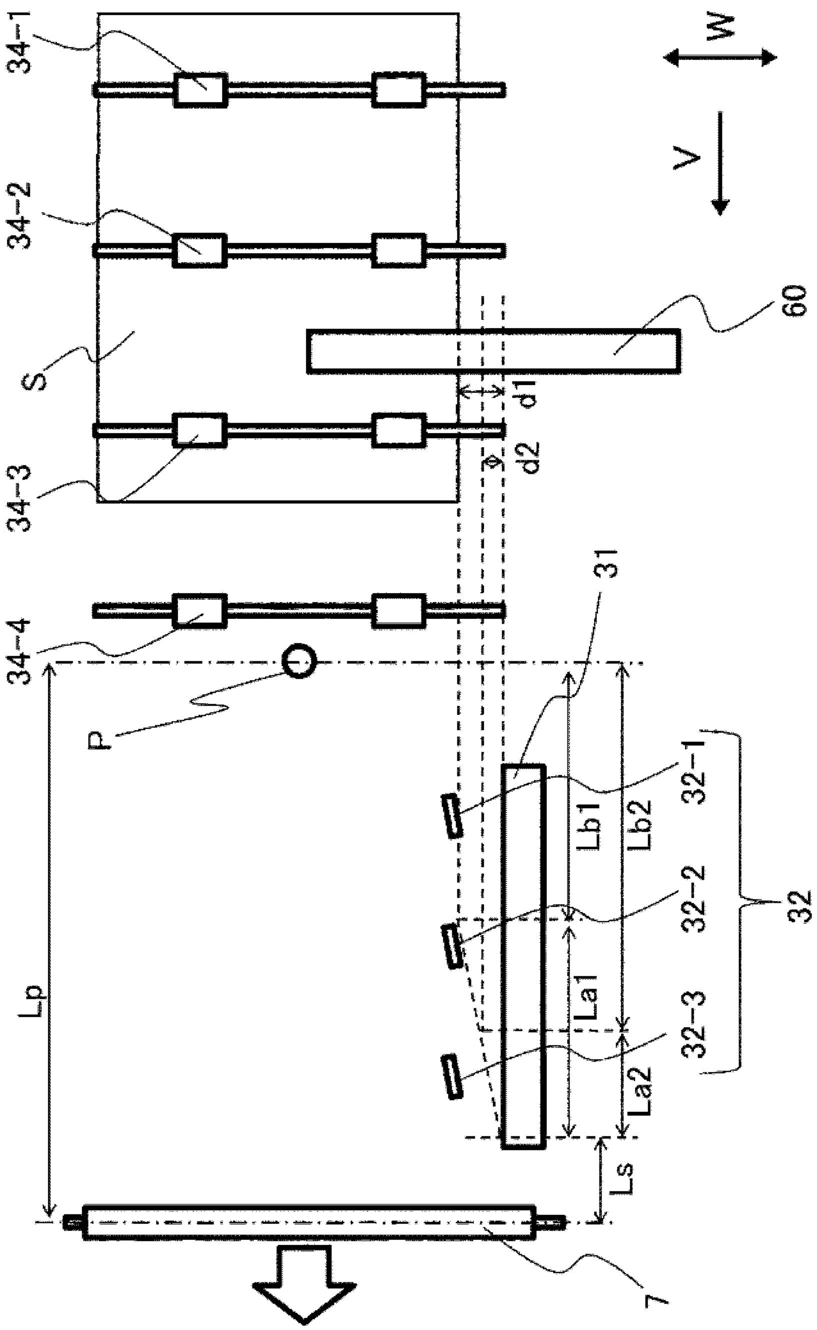
FIG. 10 is a schematic view for illustrating an operation of the sheet feeding device according to the embodiment 1.

The operation of the sheet alignment device 10 according to this embodiment will be described using FIG. 10. FIG. 10 illustrates the case of d=d1 and the case of d=d2 (d1>d2) as an example in which distances d each from the side end of the sheet S before the alignment to the abutment reference plate 31 with respect to the sheet widthwise direction W are different from each other.

A nipping release timing (T1) of the feeding roller group 34 in the case of d=d1 and a nipping release timing (T2) of the feeding roller group 34 in the case of d=d2 are represented by the following equations.

$$\begin{aligned} T1 &= Lb1/Vx \\ &= (Lp - La1 - Ls)/Vx \\ &= (Lp - Ls - d1(\tan\theta))/Vx \\ T2 &= Lb2/Vx \\ &= (Lp - La2 - Ls)/Vx \\ &= (Lp - Ls - d2/\tan\theta)/Vx \end{aligned}$$

Since d1>d2 holds, T1<T2 holds. That is, it is understood that the oblique feeding is started earlier with a larger distance d from the side end of the sheet S before the alignment to the abutment reference plate 31 and that the start of the oblique feeding is more delayed with a smaller distance d.

In other words, the controller carries out a first feeding operation (straight feeding) in which at least the feeding roller pair is put in the nipping state and is caused to feed the sheet, and then carries out a second feeding operation (oblique feeding) in which at least the obliquely feeding roller pair is put in the nipping state and is caused to feed the sheet for abutting the side end of the sheet against the reference member. Then, the controller carries out control for changing a start timing of the second feeding operation on the basis of a detection result of the detecting means. At that time, the start timing of the second feeding operation is determined so that the start timing (T1) of the second feeding operation in the case where the distance (d) from the side end of the sheet detected by the detecting means before the start of the second feeding operation to the reference member is a first length (for example, d1) is earlier than the start timing (T2) of the second feeding operation in the case where the distance (d) is a second length (for example, d2) shorter than the first length.

As described above, by changing the oblique feeding start timing depending on the position of the side end of the sheet S detected by the side end detecting portion 60, the abutment feeding section is prevented from becoming excessively long, so that delay of the feeding of the sheet S can be suppressed. The feeding delay of the sheet S is not readily caused to occur, so that such a change is also capable of contributing to improvement in throughput as the sheet feeding device and high productivity of the image forming apparatus 1.

Incidentally, in this embodiment, a calculating method in which the oblique feeding start timing (T) is continuously changed depending on the value of the distance d acquired from the position of the side end of the sheet S detected by the side end detecting portion 60 was employed, but the oblique feeding start timing may also be determined by another method. For example, magnitudes of the distance d are classified into a plurality of ranks, and a table in which values of T corresponding to the respective ranks are determined in advance is stored in the storing portion 101. Further, the value of T corresponding to the distance d detected for a current sheet S is acquired by making reference to the above-described table, so that the oblique feeding start timing may also be determined. That is, irrespective of a specific determining method, the oblique feeding start timing may only be required to be determined so that the oblique feeding start timing in the case where the distance d is the first length is earlier than the oblique feeding start timing in the case where the distance d is the second length shorter than the first length.

Embodiment 2

In the embodiment 1, the oblique feeding start timing of the sheet S was the timing when the nipping of the feeding roller group 34 is released. On the other hand, in an embodiment 2, a constitution in which the oblique feeding is started at a timing when the state of the obliquely feeding roller group 32 is changed from the non-nipping state to the nipping state while maintaining the feeding roller group 34 in the nipping state is employed.

Figure 11:
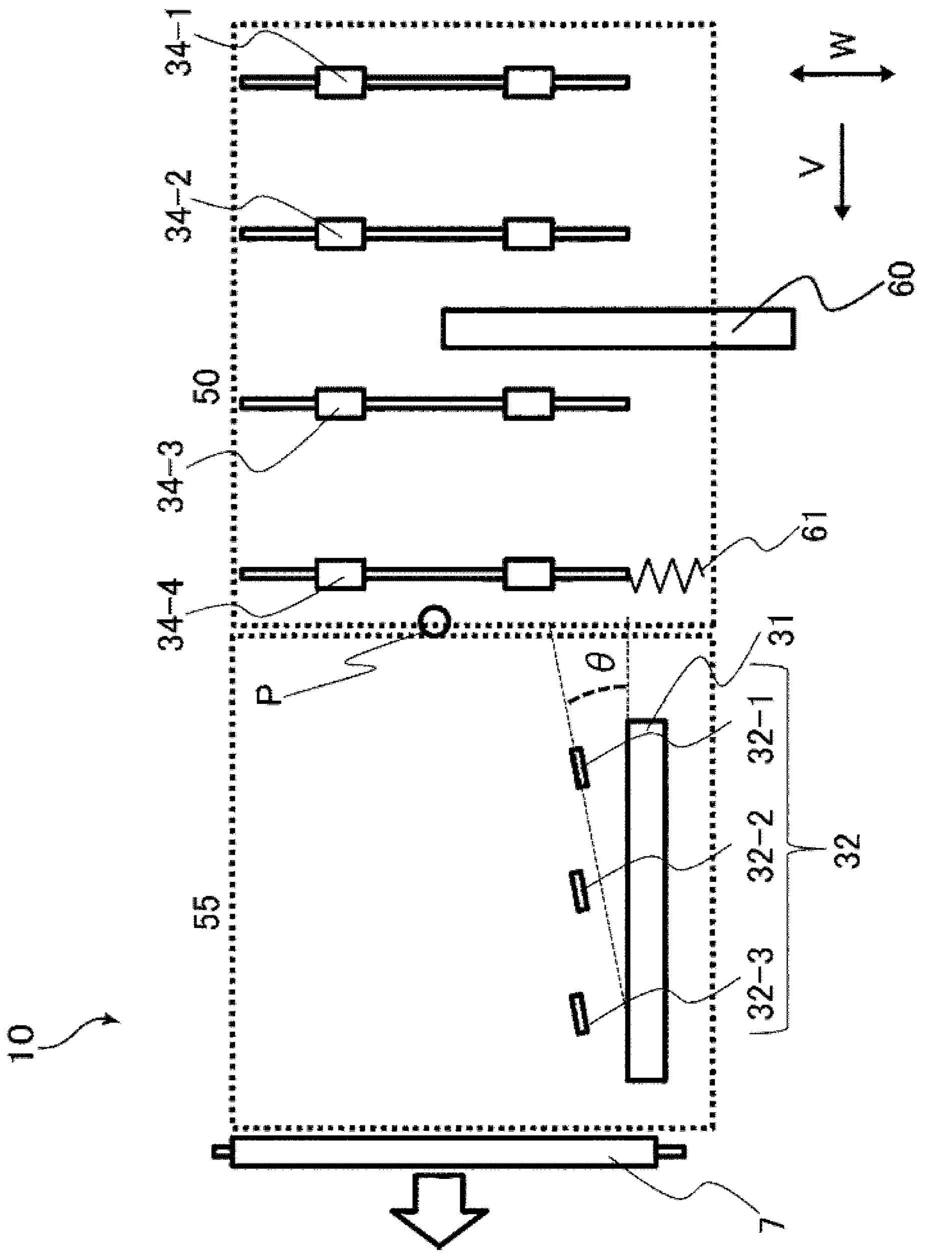
FIG. 11 is a schematic view of a sheet feeding device according to an embodiment 2.

FIG. 11 is a top (plan) view of a sheet alignment device 10 according to this embodiment. In addition to the constitution of the embodiment 1, the most downstream feeding roller pair 34-4 with respect to the sheet feeding direction V is supported so as to be capable of being slid (moved) in the sheet widthwise direction W. Further, the feeding roller pair 34-4 is urged toward an opposite side (upward direction in the figure) from the abutment reference plate 31 with respect to the sheet widthwise direction W by a thrust urging member 61 such as a spring. Other elements represented by reference numerals or symbols common to the embodiment 1 and this embodiment have substantially same constitutions and actions as those in the embodiment 1, and will be omitted from description in the following.

Figure 12A:
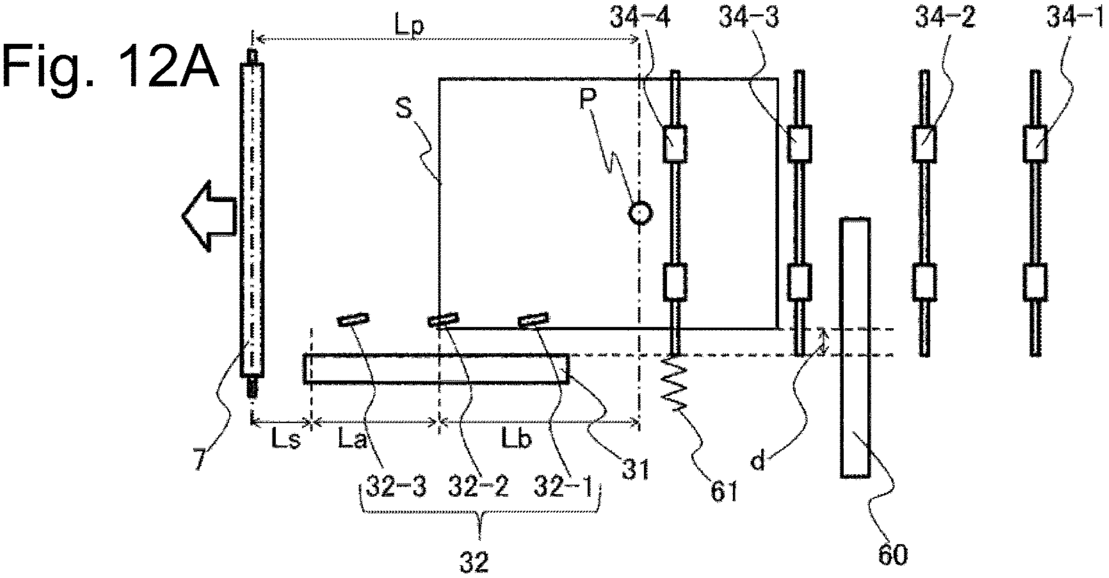
FIG. 12A is a schematic view showing an operation of the sheet feeding device according to the embodiment 2 when oblique movement of a sheet is started.
Figure 12B:
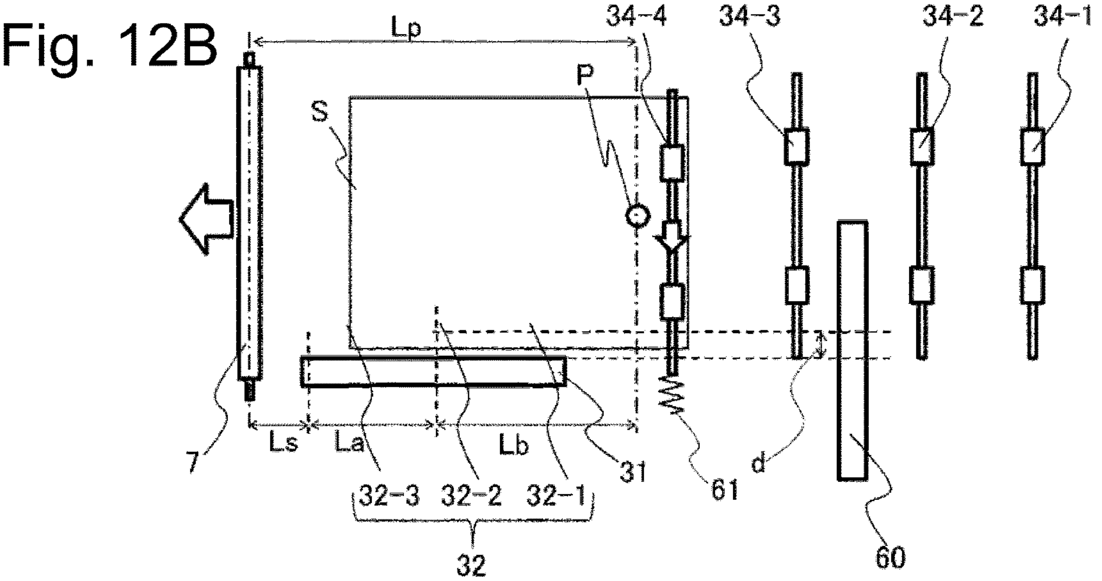
FIG. 12B is a schematic view showing the operation of the sheet feeding device according to the embodiment 2 when the sheet is slid and moved by a feeding roller pair.
Figure 12C:
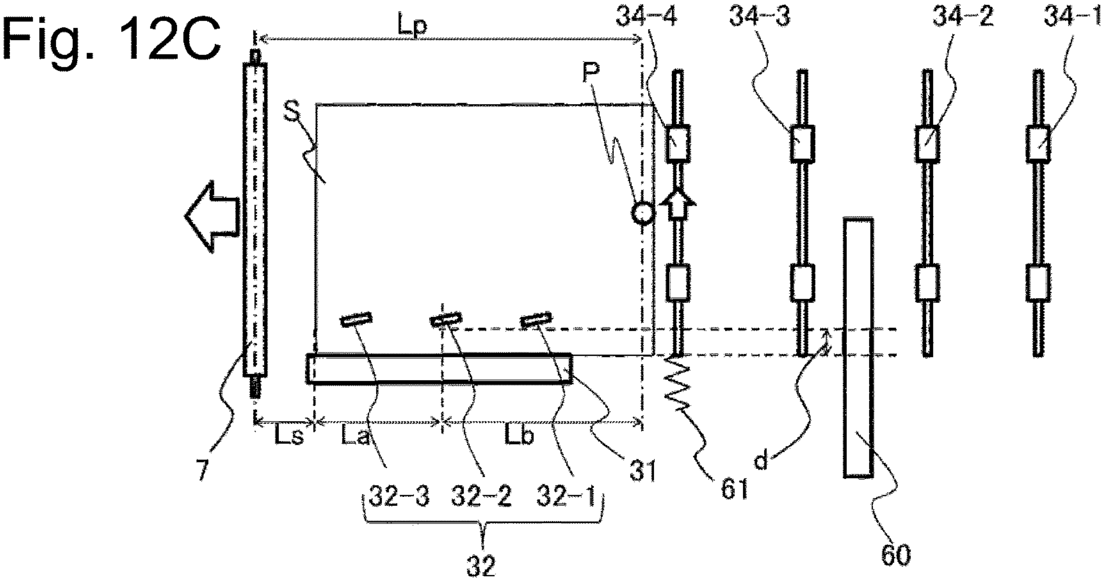
FIG. 12C is a schematic view showing the operation of the sheet feeding device according to the embodiment 2 when a trailing end of the sheet passed through the feeding roller pair.

Part (a) of FIG. 12 shows the sheet alignment device 10 when the oblique feeding of the sheet S is started. In this embodiment, it is assumed that the straight feeding of the sheet S is carried out in a state in which the feeding roller group 34 is in the nipping state and the obliquely feeding roller group 32 is in the non-nipping state. During the straight feeding, the feeding roller pair 34-4 is positioned by an urging force of the thrust urging member 61.

After the leading end of the sheet S is detected by the pre-registration sensor P, the state of the obliquely feeding roller group 32 is changed from the non-nipping state to the nipping state at a timing when a predetermined time T detected by a method similar to the method in the embodiment 1 has elapsed, and then the oblique feeding is started. Incidentally, it is assumed that at the point of the oblique feeding start timing, a trailing end of the sheet S passed through the obliquely feeding roller pairs 34-1 to 34-3 other than the most downstream obliquely feeding roller pair 34-4.

The sheet S receives a force in a downward direction in the figure with respect to the sheet widthwise direction W by being nipped by the obliquely feeding roller group 32 changed in state to the nipping state. Then, as shown in part (b) of FIG. 12, the feeding roller pair 34-4 also receives a force in the downward direction in the figure from the sheet S, so that the feeding roller pair 34-4 is slid toward one side (abutment reference plate 31 side) with respect to the sheet widthwise direction W against the urging force of the thrust urging member 61.

When the sheet S is further fed, as shown in part (c) of FIG. 12, the trailing end of the sheet S passes through the feeding roller pair 34-4. Then, by receiving the thrust urging member 61, the feeding roller pair 34-4 is slid toward the other side (side opposite from the abutment reference plate 31 side) with respect to the sheet widthwise direction W, and is returned to an original position.

Operation other than the above-described operation are similar to those in the embodiment 1, and therefore will be omitted from description. Further, a control method of the sheet alignment device 10 in this embodiment is similar to the control method in the embodiment 1 except that the step S7 in FIG. 9 is changed to a step S7 of “nipping of obliquely feeding roller”.

Also, in this embodiment, similarly as in the embodiment 1, the feeding delay of the sheet S in the sheet alignment device can be suppressed, so that it becomes possible to realize high productivity.

Embodiment 3

In the embodiments 1 and 2, a state in which there is substantially no inclination of the sheet S at the point of the time when the sheet S reaches the oblique movement correcting portion 55 was assumed. However, during actual feeding, the case where there is an inclination of the sheet S exists. The inclination of the sheet S refers to a state in which the side end of the sheet S extends in a direction crossing the sheet feeding direction V as viewed from above, and an angle between the sheet side end and the sheet feeding direction V is a magnitude of the inclination.

Figure 13A:
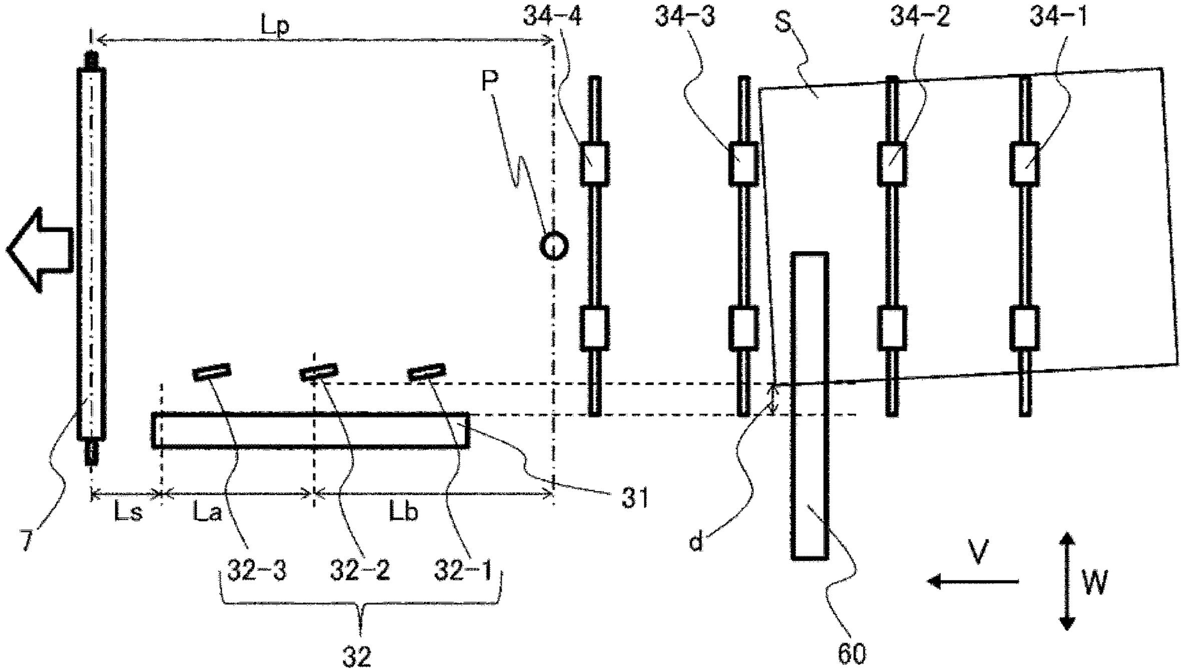
FIG. 13A is a schematic view showing an operation for feeding the sheet by feeding roller pairs in the case where there is an inclination on a rear side of the sheet feeding device in the embodiment 1.
Figure 13B:
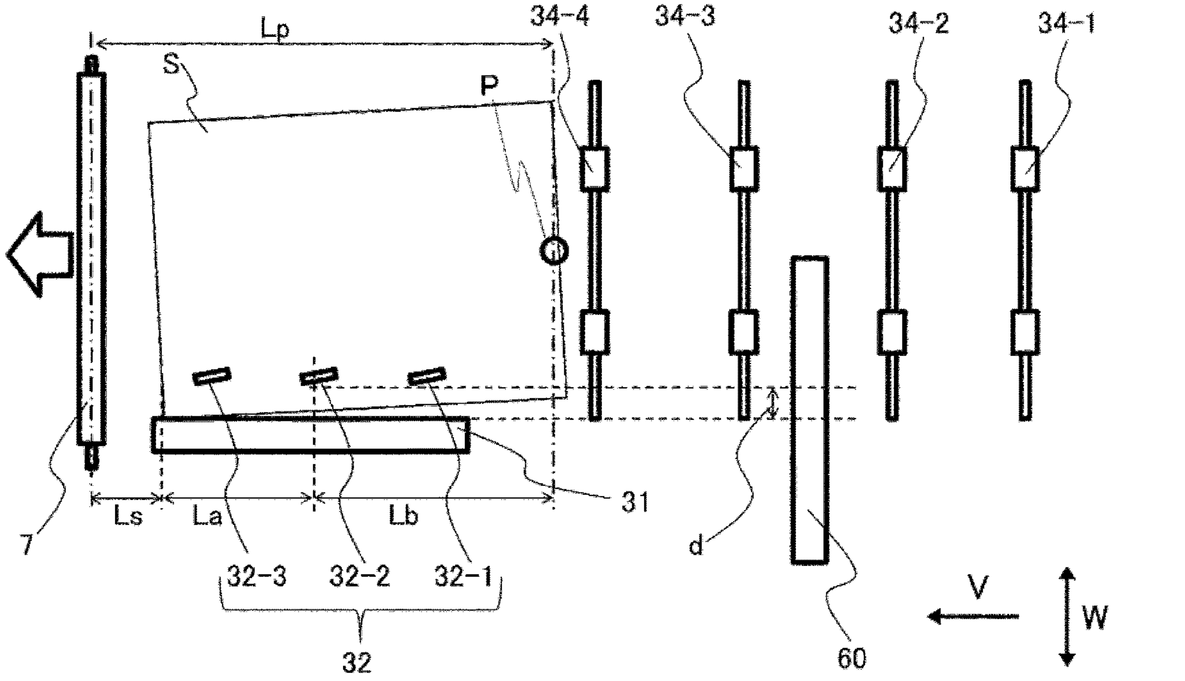
FIG. 13B is a schematic view showing a state in which a side end of the sheet contacts a reference plate in the case where there is the inclination of the sheet on the rear side of the sheet feeding device in the embodiment 1.

Part (a) of FIG. 13 shows the case where the sheet S is fed toward the oblique movement correcting portion 55 in a rear feeding state. The rear feeding state represents inclination such that compared with a sheet end portion on one side (abutment reference plate 31 side) which is the front side of the image forming apparatus 1 with respect to the sheet widthwise direction W, a sheet end portion on the other side (side opposite from the abutment reference plate 31 side) which is the rear (surface) side of the image forming apparatus 1 with respect to the sheet widthwise direction W advances. In this case, at a point of a time when a corner of the sheet S first contacts the abutment reference plate 31 (part (b) of FIG. 13), the side end S1 of the sheet S is not in a state in which the side end S1 of the sheet S follows the reference surface of the abutment reference plate 31, so that an attitude of the sheet S does not follow the abutment reference plate 31. Accordingly, in the abutment feeding distance Ls in the embodiment 1 set on the assumption of the state in which there is substantially no inclination of the sheet S, the leading end of the sheet S reaches the registration roller pair 7 before the attitude of the sheet S is corrected, so that there is a possibility that the image formation is carried out while leaving the inclination of the sheet S.

Figure 14A:
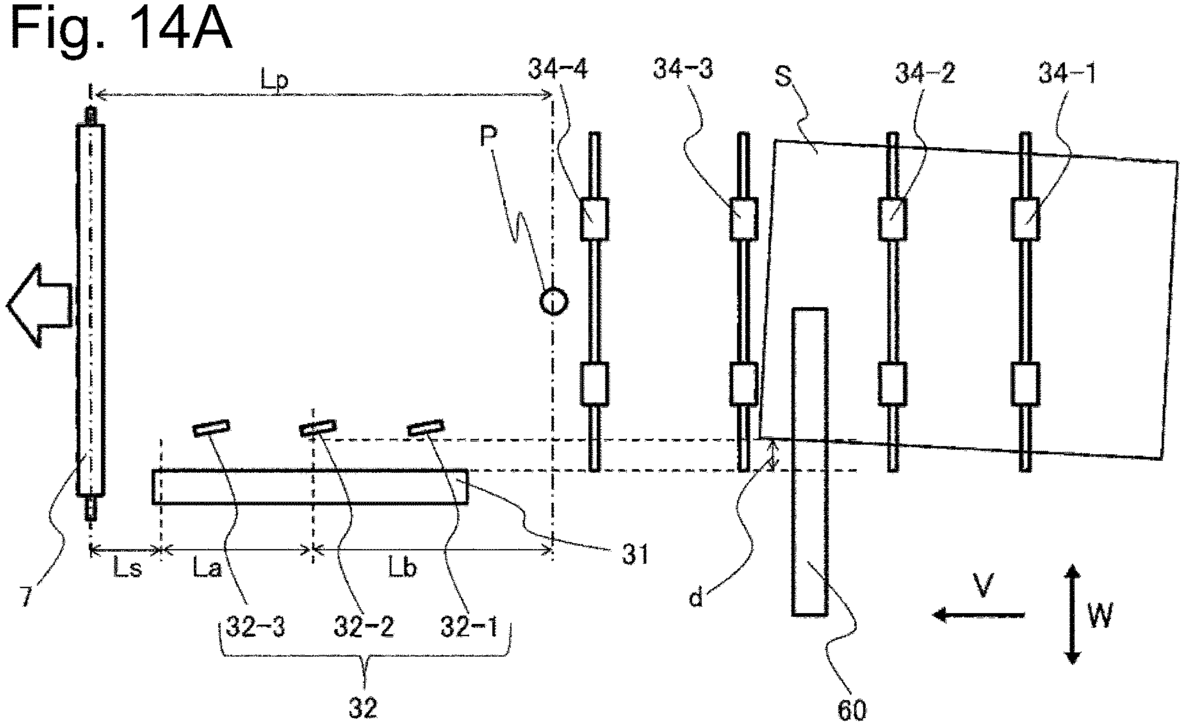
FIG. 14A is a schematic view showing an operation for feeding the sheet by feeding roller pairs in the case where there is an inclination on a front side of the sheet feeding device in the embodiment 1.
Figure 14B:
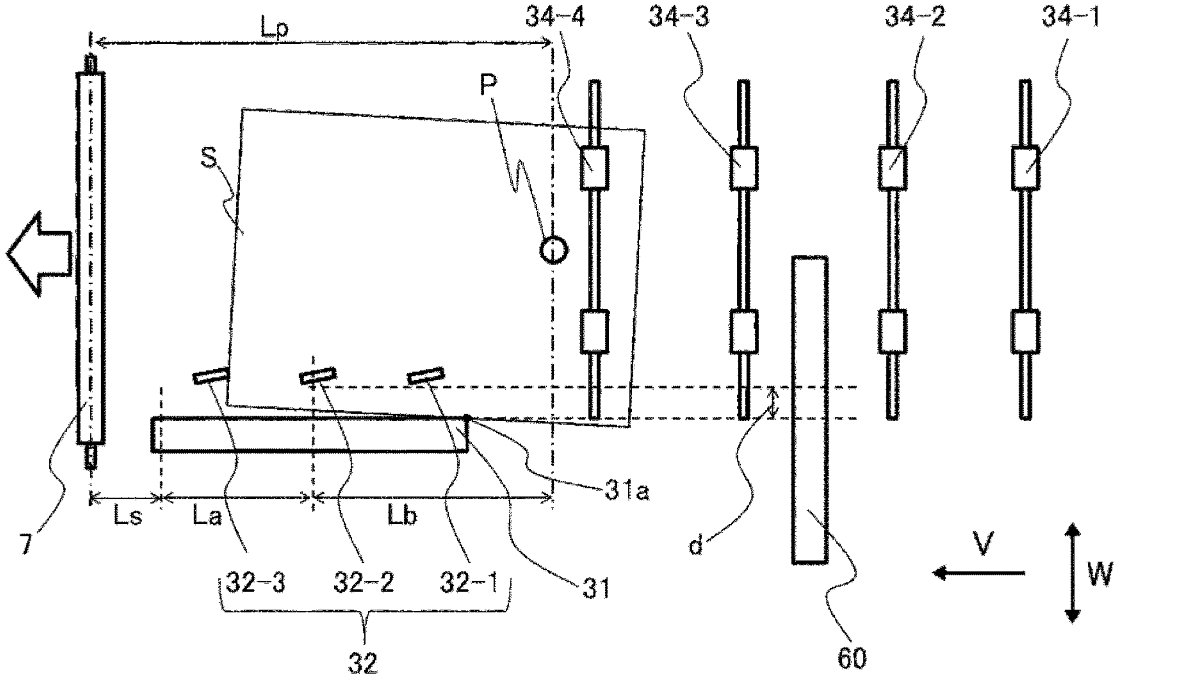
FIG. 14B is a schematic view showing a state in which a side end of the sheet contacts the reference in the case where there is the inclination of the sheet on the front side of the sheet feeding device in the embodiment 1.

On the other hand, part (a) of FIG. 14 shows the case where the sheet S is fed toward the oblique movement correcting portion 55 in a front feeding state. The front feeding state represents inclination such that the inclination direction is opposite to the inclination direction in the rear feeding state and that compared with a sheet end portion on one side (abutment reference plate 31 side) which is the front side of the image forming apparatus 1 with respect to the sheet widthwise direction W, a sheet end portion on the other side (side opposite from the abutment reference plate 31 side) with respect to the sheet widthwise direction W is delayed. In this case, when the oblique feeding is started at the same timing as the timing in the embodiment 1, the side end S1 of the sheet S starts to contact the abutment reference plate 31 at a point 31*a* (part (b) of FIG. 14). Then, a feeding distance in which the side end S1 of the sheet S actually contacts the abutment reference plate 31 becomes longer than the target abutment feeding distance Ls, so that there is a liability that feeding delay more than assumption occurs.

In this embodiment, in view of the above, optimization of the operation is performed by taking the attitude of the sheet S when the sheet S is fed to the oblique movement correcting portion 55 into consideration. A specific constitution will be described while making reference to a top view of the sheet alignment device shown in FIG. 15 and a flowchart shown in FIG. 16. Elements represented by reference numerals or symbols common to the embodiment 1 and this embodiment have the substantially same constitutions and actions as those in the embodiment 1, and will be omitted from description in the following.

Figures 15A, 15B, 15C, 15D:
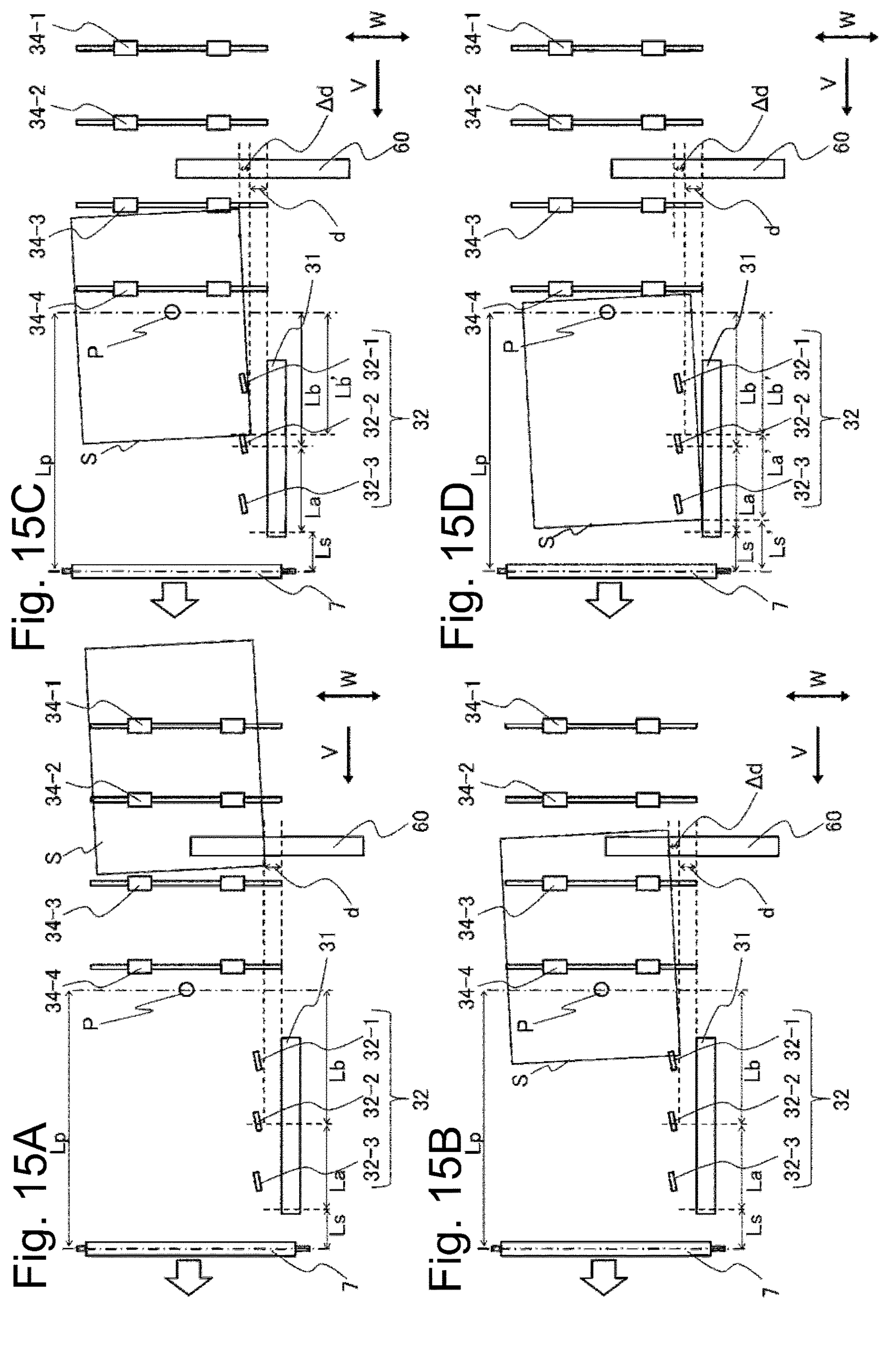
FIG. 15A is a schematic view showing an operation of a sheet feeding device according to an embodiment 3 when oblique movement of the sheet is started.
FIG. 15B is a schematic view showing the operation of the sheet feeding device according to the embodiment 3 when a side end of the sheet on a trailing end side is detected by a detecting portion.
FIG. 15C is a schematic view showing the operation of the sheet feeding device according to the embodiment 3 when the sheet is fed by obliquely feeding rollers.
FIG. 15D is a schematic view showing the operation of the sheet feeding device according to the embodiment 3 when the side end of the sheet reached the reference member (reference plate).
Figure 16:
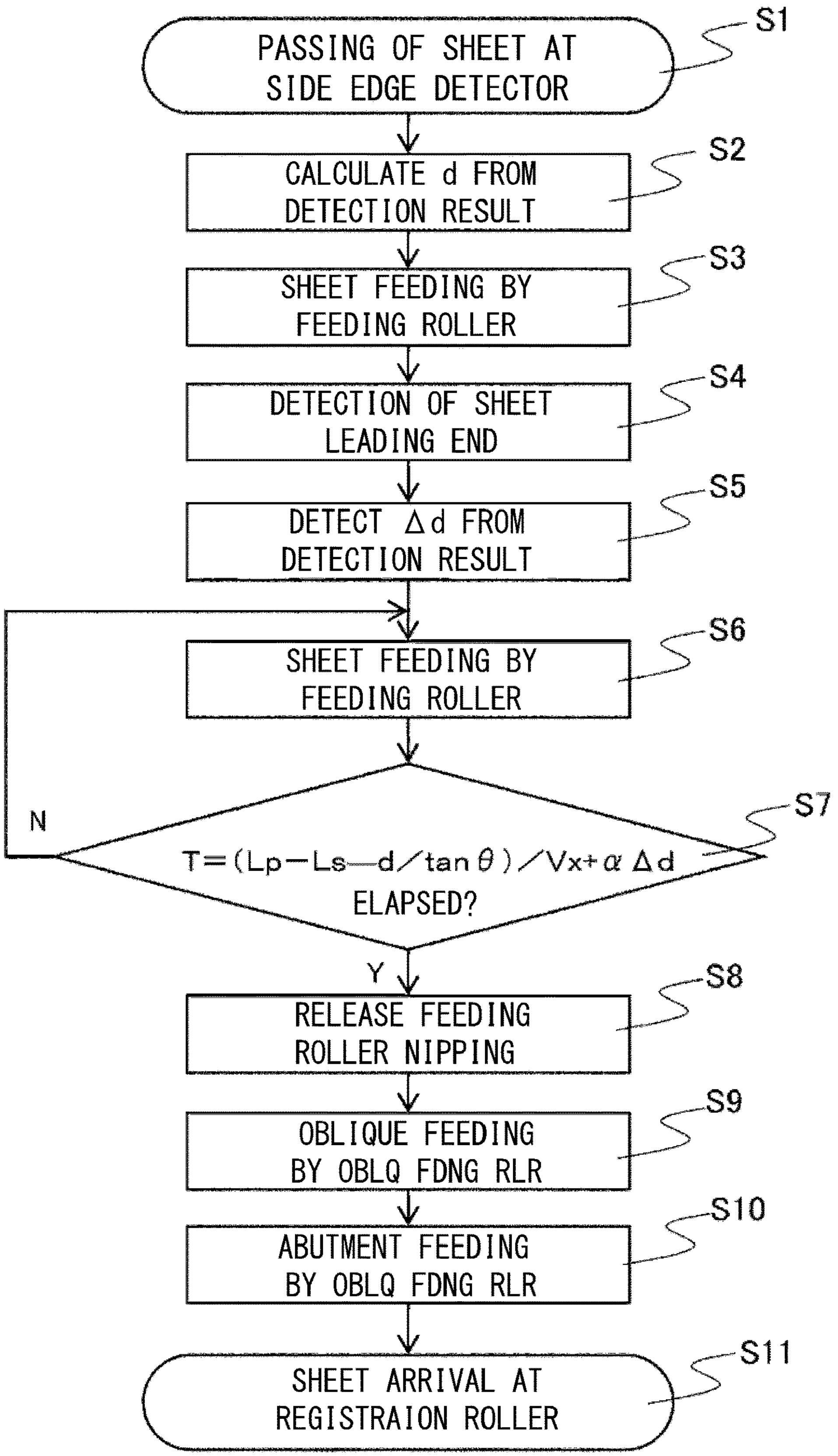
FIG. 16 is a flowchart showing a control method of the sheet feeding device according to the embodiment 3.

Part (a) of FIG. 15 shows the sheet alignment device 10 when the position of the side end S1 of the sheet S fed in the rear feeding state is detected by the side end detecting portion 60. The contents of the flowchart until the pre-registration sensor P detects the leading end of the sheet S (S1 to S4 of FIG. 16) are similar to those in the embodiment 1, and therefore will be omitted from description.

In this embodiment, as shown in part (b) of FIG. 15, even on a trailing end side of the sheet S, the position of the side end S1 of the sheet S with respect to the sheet widthwise direction W by using the side end detecting portion 60. By this, an inclination amount Δt of the sheet S can be calculated (S5). The inclination amount Δt is difference between a position of the side end S1 with respect to the sheet widthwise direction W measured at a predetermined portion (first portion) of the sheet S on a leading end side and a position of the side end S1 with respect to the sheet widthwise direction W measured at a predetermined portion (second portion) of the sheet S on a trailing end side.

When a distance, based on a measurement result on the leading end side, from the side end S1 to the abutment reference plate 31 with respect to the sheet widthwise direction W is d3 and a distance, based on measurement result on the trailing end side, from the side end S1 to the abutment reference plate 31 with respect to the sheet widthwise direction W is d4, Δt=d3−d4 holds. At is a real number capable of providing a negative value, and positive and negative signs correspond to inclination directions (whether the state is the front feeding state or the rear feeding state).

In this embodiment, the controller 100 changes a target value of the abutment feeding distance Ls on the basis of the value of Δt. When the abutment feeding distance after the change is Ls' with respect to the abutment feeding distance Ls in the embodiment 1, the oblique feeding start timing (T) can be represented by the following formula (5) obtained by modifying the above-described formula (4).

$$\begin{aligned} T &= (Lp - Ls' - d/\tan\theta)/Vx \\ &= (Lp - Ls - d/\tan\theta)/Vx + \alpha\Delta t \end{aligned} \tag{5}$$

α: positive constant

At a timing when the predetermined time T acquired by the above-described calculation formula has elapsed after the leading end of the sheet S passes through the pre-registration sensor P, the nipping of the feeding roller group 34 is released (S7, S8). By this, the sheet S starts to move in an oblique direction in accordance with a force received from the obliquely feeding roller group 32 with respect to the sheet widthwise direction W and approaches the abutment reference plate 31 (S9, part (c) of FIG. 15). Thereafter, the sheet S is further fed while the side end S1 thereof is abutted against the abutment reference plate 31, so that the inclination of the sheet S is corrected (S10, part (d) of FIG. 15). Then, when the leading end of the sheet S reaches the registration roller pair 7, this flowchart is ended (S11).

According to this embodiment, in consideration of also the attitude of the sheet S, the abutment feeding distance can be made near to a necessary minimum. Specifically, from the above-described formula (5), in the case of the rear feeding state (in the case where Δt is a negative value), the value of T becomes small, so that the oblique feeding start timing becomes early compared with the embodiment 1. As a result, as shown in part (d) of FIG. 15, a feeding distance Lb' in the straight feeding section becomes shorter than the feeding distance Lb in the case where the embodiment 1 is applied, and the abutment feeding distance Ls' becomes longer than the abutment feeding distance Ls in the case where the embodiment 1 is applied. By this, it is possible to avoid that the abutment feeding distance becomes insufficient in the case of the rear feeding state and thus the inclination correction becomes insufficient.

On the other hand, in the case of the front feeding state (in the case where Δt is a positive value), the value of T becomes large, so that the oblique feeding start timing is delayed compared with the embodiment 1. In this case, the feeding distance Lb' in the straight feeding section becomes longer than the feeding distance Lb in the case where the embodiment 1 is applied, and the abutment feeding distance Ls' becomes shorter than the abutment feeding distance Ls in the case where the embodiment 1 is applied. By this, it is possible to prevent that an actual abutment feeding distance becomes excessive in the case of the front feeding state, and thus it is possible to except that the feeding delay is reduced more than the embodiment 1.

In other words, the distance with respect to the sheet widthwise direction from the position of the sheet side end detected by the detecting means at the first portion of the sheet to the reference member is referred to as a third length (d3). Further, the distance with respect to the sheet widthwise direction from the position of the sheet side end detected by the detecting means at the second portion of the sheet, passing through the detecting means later than the first portion of the sheet passing through the detecting means, to the reference member is referred to as a fourth length (d4). In this case, when the third length is longer than the fourth length (when Δt is negative), a start timing of the second feeding operation becomes earlier than in the embodiment 1. When the third length is shorter than the fourth length (when Δt is positive), the start timing of the second feeding operation becomes later than in the embodiment 1.

By employing such a constitution, even in the case where there is an inclination of the sheet before the alignment, it is possible to prevent the occurrence of the feeding delay due to that the inclination correction becomes insufficient due to shortage of the abutment feeding distance and that the actual abutment feeding distance becomes excessive.

Incidentally, in this embodiment, in order to detect the inclination amount Δd of the sheet S, side end develops of the sheet S on the leading end side and the trailing end side were read by a single side end detecting portion 60. However, it is only required that the inclination amount of the sheet S is read, and therefore, for example, two side end detecting portions 60 are provided as the detecting means, and simultaneously Δd may also be calculated on the basis of detected information.

Further, in this embodiment, a modified embodiment in which the determining method of the oblique feeding start timing (T) was changed in the constitution of the embodiment 1 was described, a modified embodiment in which the determining method of the oblique feeding start timing (T) was changed in the constitution of the embodiment 1 may also be applied.

Embodiment 4

In the embodiments 1 to 3, both the positional deviation and the attribute deviation (inclination) were corrected by causing the side end S1 of the sheet S to abut against the abutment reference plate 31. In this embodiment, a constitution in which at least a part of the positional deviation of the sheet S is corrected by another means will be described.

Figure 17:
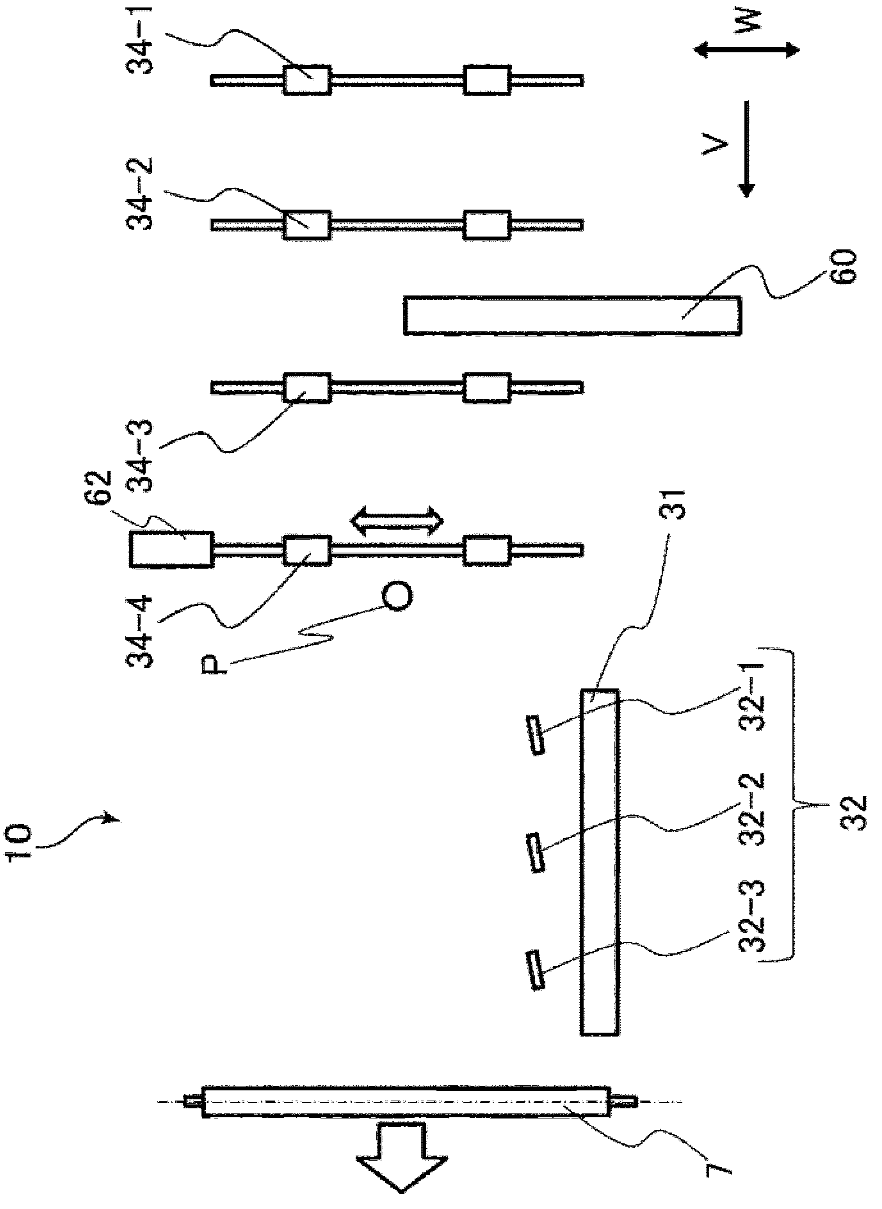
FIG. 17 is a schematic view of a sheet feeding device according to an embodiment 4.
Figure 18A:
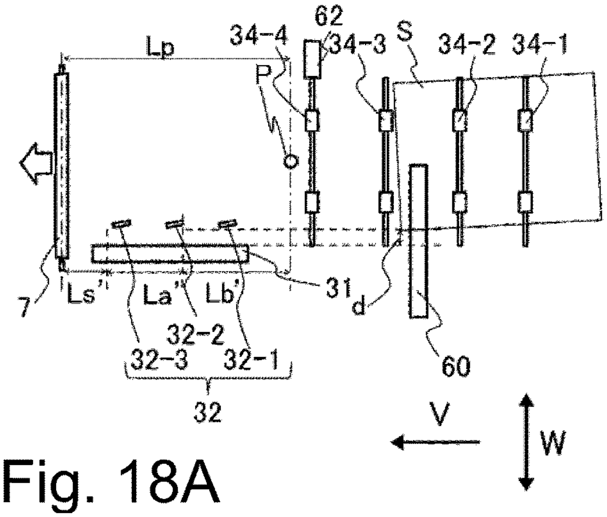
FIG. 18A is a schematic view showing an operation of the sheet feeding device according to the embodiment 4 when a side end of the sheet on a leading end side is detected by a detecting portion.
Figure 18D:
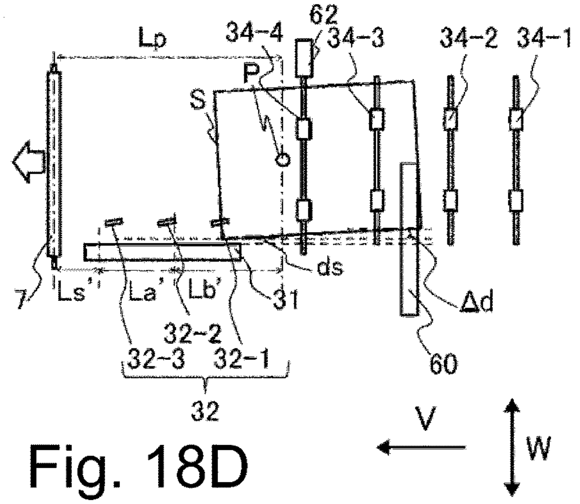
FIG. 18D is a schematic view showing the operation of the sheet feeding device according to the embodiment 4 when the sheet reached obliquely feeding rollers.
Figure 18B:
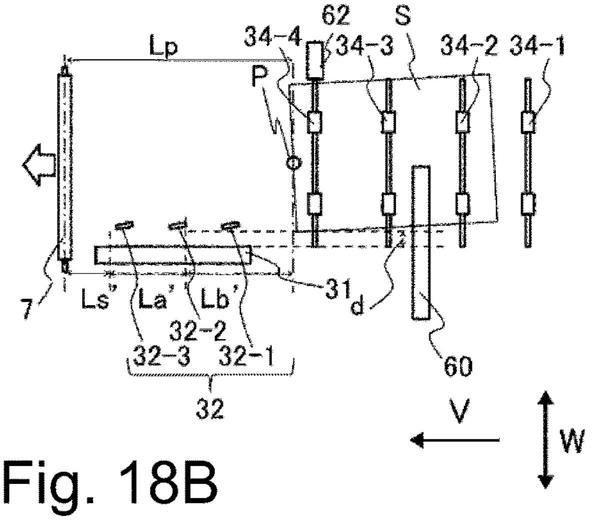
FIG. 18B is a schematic view showing the operation of the sheet feeding device according to the embodiment 4 when the leading end of the sheet is detected by a pre-registration sensor.
Figure 18E:
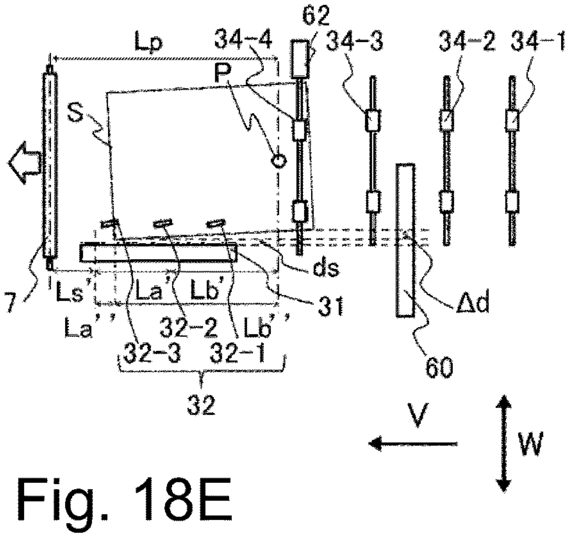
FIG. 18E is a schematic view showing the operation of the sheet feeding device according to the embodiment 4 when the sheet is obliquely fed by the obliquely feeding rollers.
Figure 18C:
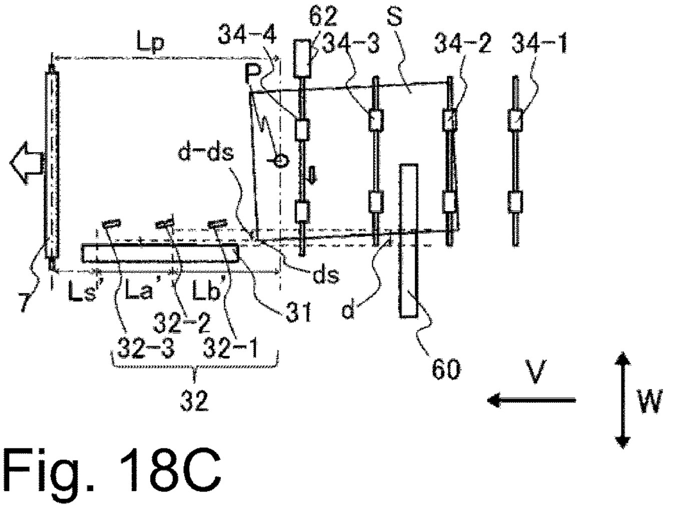
FIG. 18C is a schematic view showing the operation of the sheet feeding device according to the embodiment 4 when the sheet is slid and moved by feeding roller pairs.

FIG. 17 is a top view of a sheet alignment device 10 in this embodiment. A difference from the embodiments 1 to 3 is that a roller shifting device 62 is connected to the most-downstream feeding roller pair 34-4. The roller shifting device 62 functions as a moving means for sliding and moving (shifting) the feeding roller pair 34-4 in the sheet widthwise direction W (front-rear direction of the image forming apparatus 1) during the feeding of the sheet by the feeding roller pair 34-4 (during execution of the straight feeding).

Figure 19:
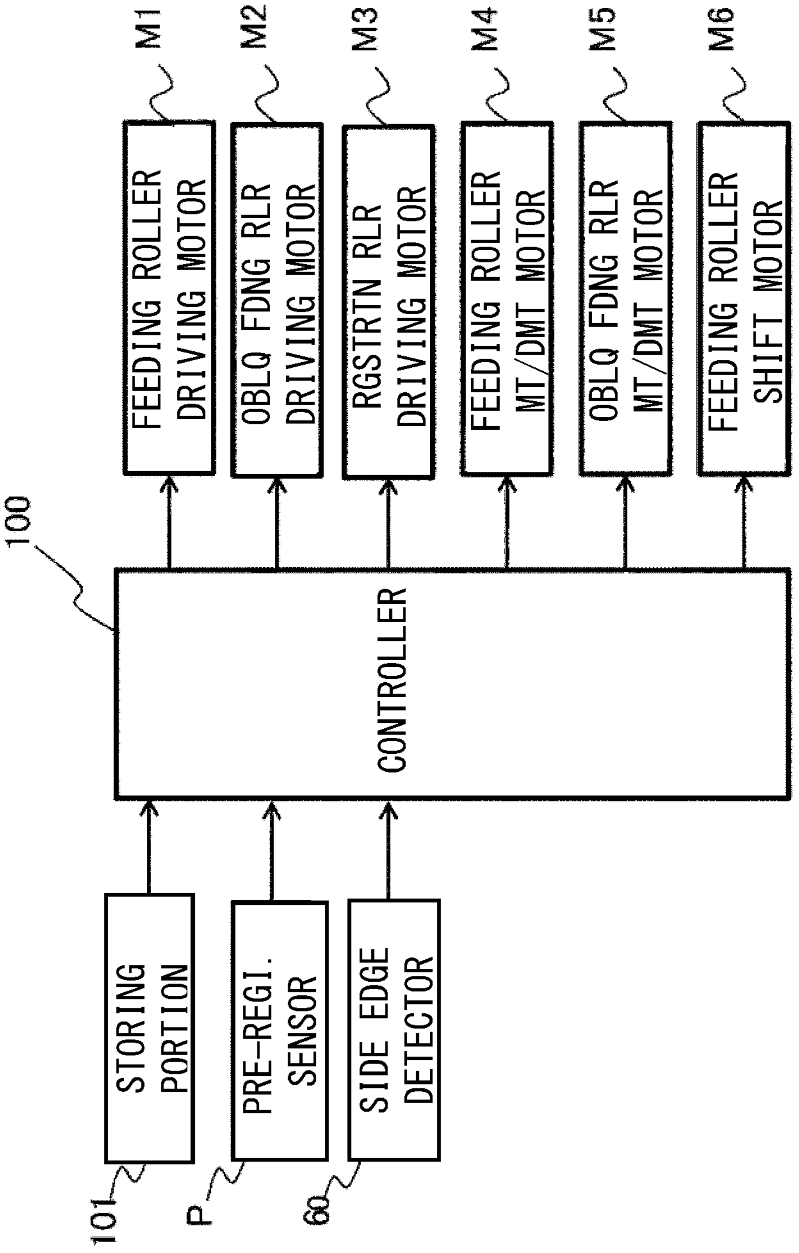
FIG. 19 is a block diagram showing a constitution of the sheet feeding device according to the embodiment 4.

In the following, details of this embodiment will be described while making reference to top views of the sheet alignment device 10 shown in parts (a) to (e) of FIG. 18, a control block diagram shown in FIG. 19, and a flowchart shown in FIG. 20. FIG. 19 is the block diagram showing a system constitution of the image forming apparatus 1 relating to control of the sheet alignment device 10 of this embodiment. This constitution is similar to the constitution in the embodiment 1 except that to the output side of the controller 100, a feeding roller shifting motor M6 is connected. The feeding roller shifting motor M6 is a driving source for the roller shifting device 62, and the controller 100 is capable of controlling a sliding operation (moving operation) of the feeding roller pair 34-4 by providing an instruction to the feeding roller shifting motor M6.

Figure 20:
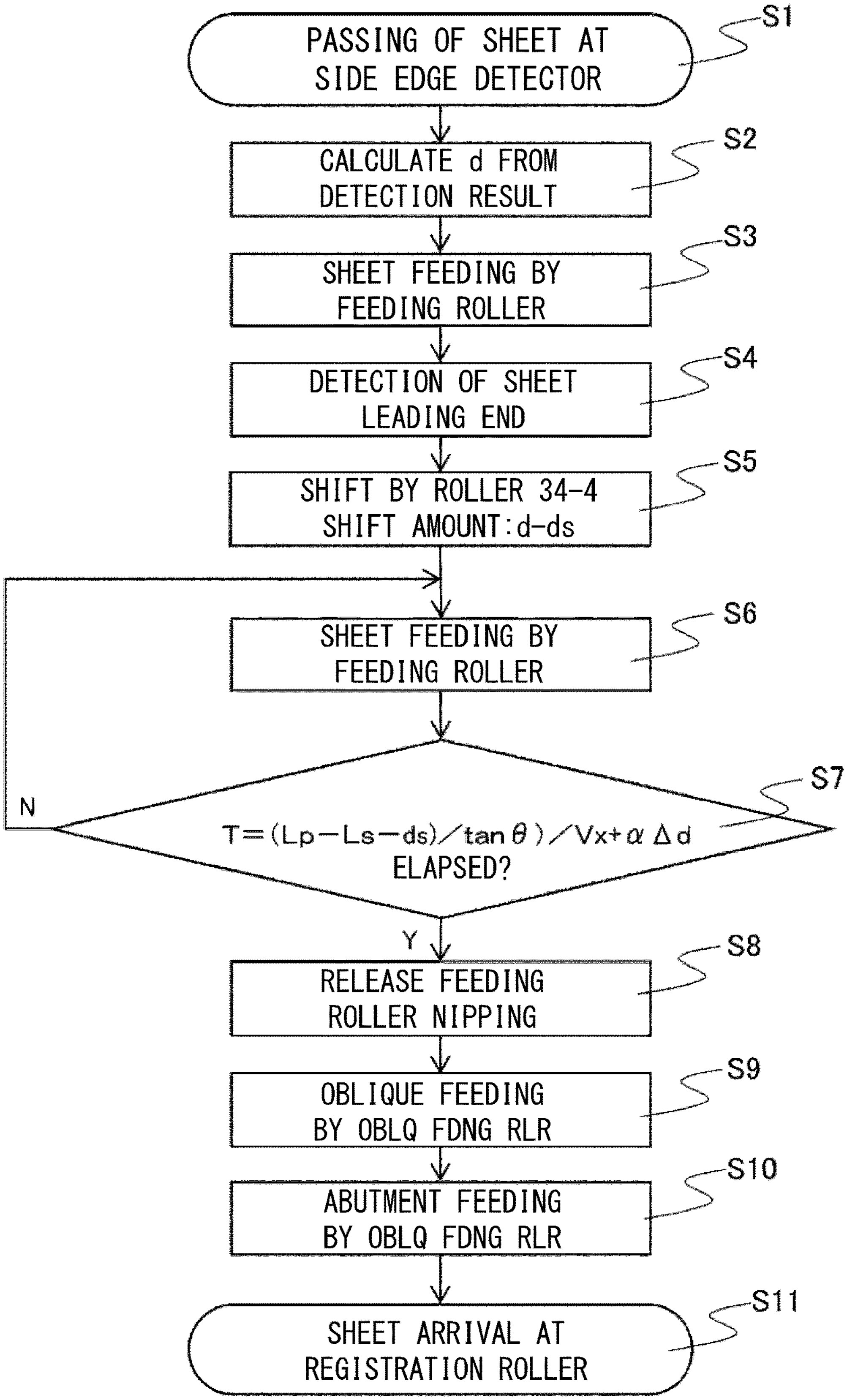
FIG. 20 is a flowchart showing a control method of the sheet feeding device according to the embodiment 4.

Part (a) of FIG. 18 shows a timing when a predetermined portion (first portion) of the sheet S on the leading end side passes through the side end detecting portion 60 (S1 of FIG. 20). At this time, on the basis of a detection result of the side end detecting portion 60, the distance d from the side end S1 of the sheet S to the abutment reference plate 31 with respect to the sheet widthwise direction W is detected (S2). Thereafter, the straight feeding of the sheet S by the feeding roller group 34 is continued (S3), and when the leading end of the sheet S reaches a detecting position of the pre-registration sensor P (part (b) of FIG. 18), the sheet S is detected by the pre-registration sensor P (S4).

With detection of the leading end of the sheet S by the pre-registration sensor P as a trigger, the controller 100 provides the instruction to the feeding roller shifting motor M6, so that a moving operation in which the feeding roller pair 34-4 is slid and moved (shifted) in a movement amount of d-ds is carried out (part (c) of FIG. 18, S5). However, ds refers to a target value of the distance from the sheet side end to the abutment reference plate 31 with respect to the sheet widthwise direction W. By this, the sheet S nipped by the feeding roller pair 34-4 is also shifted by d-ds.

After the feeding roller pair 34-4 is slid, as shown in part (d) of FIG. 18, the sheet S is fed while maintaining the distance from the sheet side end to the abutment reference plate 31 at ds (S6). At this time, factors which should be corrected by the oblique feeding and the abutment feeding of the sheet S by the obliquely feeding roller group 32 is:

Positional deviation with respect to sheet widthwise direction W: ds, and

Inclination amount: Δt.

Incidentally, also, in this embodiment, the position of the side end S1 of the sheet S with respect to the sheet widthwise direction W is detected on each of the leading end side and the trailing end side of the sheet S by using the side end detecting portion 60.

Therefore, a value of the predetermined time determining the oblique feeding start timing can be represented by the following formula (6) in which ds is substituted for d in the above-described formula (5).

$$
\begin{aligned}
T &= (Lp - Ls' - d/\tan\theta)/Vx \\
&= (Lp - Ls - d/\tan\theta)/Vx + \alpha\Delta t
\end{aligned}
\tag{6}
$$

$\alpha$ : constant

That is, on the basis of the distance (ds) with respect to the sheet widthwise direction W from the position of the sheet side end to the reference member in a state of the feeding roller pair 34-4 after the sliding operation (after the moving operation), the start timing of the second feeding operation is determined.

At a timing when the predetermined time T formula has elapsed after the leading end of the sheet S passes through the pre-registration sensor P, the nipping of the feeding roller group 34 is released (S7, S8). By this, the sheet S starts to move in an oblique direction in accordance with a force received from the obliquely feeding roller group 32 with respect to the sheet widthwise direction W and approaches the abutment reference plate 31 (S9, part (e) of FIG. 19). Thereafter, the sheet S is further fed while the side end S1 thereof is abutted against the abutment reference plate 31, so that the inclination of the sheet S is corrected (S10, part (d) of FIG. 15). Then, when the leading end of the sheet S reaches the registration roller pair 7, this flowchart is ended (S11).

According to this embodiment, the slide movement of the feeding roller pair 34-4 is carried out on the basis of the position of the sheet side end before the alignment detected by the side end detecting portion 60, and therefore, most of the positional deviation of the sheet S with respect to the sheet widthwise direction W is eliminated by the slide movement of the feeding roller pair 34-4. In other words, a movement amount of the feeding roller pair by the moving operation is changed so that the movement amount of the feeding roller pair by the moving operation in the case where the distance from the sheet side end before the alignment to the reference member is the first length is made larger than the movement amount of the feeding roller pair by the moving operation in the case where the distance is the second length shorter than the first length.

By this, the feeding distance in the straight feeding section can be made remarkably long from Lb' described in the embodiment 3 to Lb", so that the feeding distance in the oblique feeding section is made remarkably short from La' to La". In general, a nipping force of the sheet S by the feeding roller pair is larger than that by the obliquely feeding roller pair based on a premise that the sheet S is fed while being slipped, and therefore, a feeding delay amount can be made small with an increasing ratio of the straight feeding distance. Therefore, in this embodiment in which the long straight feeding distance is ensured, compared with the embodiment 3, the feeding delay can be further reduced.

Other Embodiments

The present invention is also realized by processing in which the program for achieving one or more function in the above-described embodiments is supplied to the system or the apparatus via a network or a storing medium and in which one or more processor in a computer of the system or the apparatus reads and executes the program. Further, the present invention is also capable of being realized by a circuit (for example, ASIC) for realizing one or more function.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-005875 filed on Jan. 18, 2021, which is hereby incorporated by reference herein in its entirety.

What is claimed is:

1. A sheet feeding device comprising:

a feeding roller pair configured to feed a sheet in a sheet feeding direction;

a reference member provided downstream of said feeding roller pair with respect to the sheet feeding direction and extending along the sheet feeding direction;

an obliquely feeding roller pair provided downstream of said feeding roller pair with respect to the sheet feeding direction and configured to feed the sheet in the sheet feeding direction while abutting a side end of the sheet against said reference member with respect to a sheet widthwise direction perpendicular to the sheet feeding direction;

detecting means provided upstream of said obliquely feeding roller pair and configured to detect a position of the side end of the sheet with respect to the sheet widthwise direction;

first changing means configured to change a state of said feeding roller pair between a nipping state in which the sheet is nipped and fed and a non-nipping state in which nipping of the sheet is released;

second changing means configured to change a state of said obliquely feeding roller pair between the nipping state and the non-nipping state; and a controller configured to control said first changing means and said second changing means, wherein said controller causes said feeding roller pair to be in the nipping state and to start a first feeding operation for feeding the sheet toward said obliquely feeding roller and then, said controller causes said obliquely feeding roller pair to be in the nipping state and to start a second feeding operation for feeding the sheet for abutting the side end against said reference member, wherein said controller changes, after the first feeding operation is started and before the second feeding operation is started, a start timing of the second feeding operation on the basis of a detection result of the position of the side end of the sheet detected by said detecting means.

2. A sheet feeding device according to claim 1, wherein said controller makes a start timing of the second feeding operation in a case that a distance from the position of the side end of the sheet detected by said detecting means to said reference member is a first length earlier than a start timing of the second feeding operation in a case that the distance is a second length shorter than the first length.

3. A sheet feeding device according to claim 2, further comprising moving means configured to slide and move said feeding roller pair in the sheet widthwise direction, wherein during execution of the first feeding operation, said controller executes a moving operation for moving said feeding roller pair by said moving means so that the side end of the sheet approaches said reference member, and wherein said controller changes a movement amount of said feeding roller pair by the moving operation on the basis of the detection result of said detecting means so that a movement amount of said feeding roller pair by the moving operation in a case that the distance is the first length is larger than a movement amount of said feeding roller pair by the moving operation in a case that the distance is the second length.

4. A sheet feeding device according to claim 3, wherein said controller determines the start timing of the second feeding operation on the basis of a distance from the position of the side end of the sheet to said reference member in a state after the moving operation.

5. A sheet feeding device according to claim 1, wherein in the first feeding operation, said controller causes both said feeding roller pair and said obliquely feeding roller pair to be in the nipping state, and wherein in the second feeding operation, said controller causes said feeding roller pair to be in the non-nipping state by said first changing means and causes said obliquely feeding roller pair to be in the nipping state by said second changing means.

6. A sheet feeding device according to claim 1, wherein in the first operation, said controller causes said feeding roller pair to be in the nipping state by said first changing means and causes said obliquely feeding roller pair to be in the non-nipping state by said second changing means, and wherein in the second feeding operation, said controller causes both said feeding roller pair and said obliquely feeding roller pair to be in the nipping state.

7. A sheet feeding device according to claim 6, wherein said feeding roller pair is supported slidably in the sheet widthwise direction, wherein said sheet feeding device further comprises an urging member configured to urge said feeding roller pair toward a side opposite from said reference member with respect to the sheet widthwise direction, wherein in the first feeding operation, said feeding roller pair is positioned with respect to the sheet feeding device by an urging force of said urging member, and wherein in the second feeding operation, said feeding roller pair slides together with the sheet toward a side of said reference member with respect to the sheet widthwise direction against the urging force of said urging member.

8. A sheet feeding device according to claim 1, wherein said controller changes the start timing of the second feeding operation on the basis of the position of the side end of the sheet detected by said detecting means at a first portion of the sheet with respect to the sheet feeding direction and the position of the side end of the sheet detected by said detecting means at a second portion of the sheet which passes through said detecting means after said first portion passes.

9. An image forming apparatus comprising:

a sheet feeding device according to claim 1; and image forming means configured to form an image on the sheet fed by said sheet feeding device.

* * * * *